(12) United States Patent
Furuichi et al.

(10) Patent No.: US 11,736,958 B2
(45) Date of Patent: Aug. 22, 2023

(54) COMMUNICATION CONTROL DEVICE, AND COMMUNICATION CONTROL METHOD FOR DETERMINING A FREQUENCY RANGE TO BE USED BY A BASE STATION

(71) Applicant: Sony Group Corporation, Tokyo (JP)

(72) Inventors: Sho Furuichi, Tokyo (JP); Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 128 days.

(21) Appl. No.: 17/349,919

(22) Filed: Jun. 17, 2021

(65) Prior Publication Data

US 2021/0314787 A1 Oct. 7, 2021

Related U.S. Application Data

(63) Continuation of application No. 16/515,054, filed on Jul. 18, 2019, now Pat. No. 11,064,369, which is a (Continued)

(30) Foreign Application Priority Data

Oct. 16, 2014 (JP) ................................. 2014-211359

(51) Int. Cl.
*H04W 48/08* (2009.01)
*H04W 16/32* (2009.01)
(Continued)

(52) U.S. Cl.
CPC ........... *H04W 16/32* (2013.01); *H04W 16/02* (2013.01); *H04W 24/02* (2013.01); *H04W 48/08* (2013.01);
(Continued)

(58) Field of Classification Search
CPC ....... H04W 16/14; H04W 4/02; H04W 40/16; H04W 48/08; H04W 4/021; H04W 28/26
See application file for complete search history.

(56) References Cited

U.S. PATENT DOCUMENTS

2002/0032032 A1  3/2002  Haumont et al.
2003/0206130 A1  11/2003  Husted et al.
(Continued)

FOREIGN PATENT DOCUMENTS

CN  101411225 A  4/2009
CN  102474731 A  5/2012
(Continued)

OTHER PUBLICATIONS

Japanese Office Action dated Jun. 4, 2019, issued in corresponding Japanese Patent Application No. 2016-553998.
(Continued)

*Primary Examiner* — Tu X Nguyen
(74) *Attorney, Agent, or Firm* — Xsensus LLP

(57) ABSTRACT

[Object] To provide a communication control device, a base station, a terminal device, a communication control method, and a wireless communication method which are capable of improving user throughput by performing more flexible frequency control. [Solution] Provided is a communication control device including: a communication unit configured to communicate with a base station of a wireless communication system in which one or more frequencies are used; a setting unit configured to set an event and set a frequency to be used by the base station using occurrence of the set event as a trigger; and an acquiring unit configured to acquire information for the setting by the setting unit.

16 Claims, 29 Drawing Sheets

Related U.S. Application Data continuation of application No. 16/111,986, filed on Aug. 24, 2018, now Pat. No. 10,397,806, which is a continuation of application No. 15/513,789, filed as application No. PCT/JP2015/073284 on Aug. 19, 2015, now Pat. No. 10,075,853.

(51) Int. Cl.
*H04W 16/02* (2009.01)
*H04W 24/02* (2009.01)
*H04W 72/23* (2023.01)
*H04W 48/16* (2009.01)
*H04W 92/18* (2009.01)

(52) U.S. Cl.
CPC ............ *H04W 48/16* (2013.01); *H04W 72/23* (2023.01); *H04W 92/18* (2013.01)

(56) References Cited

U.S. PATENT DOCUMENTS

| | | |
|---|---|---|
| 2007/0060065 A1 | 3/2007 | Kruys et al. |
| 2007/0243873 A1 | 10/2007 | Jin et al. |
| 2008/0037469 A1 | 2/2008 | Hamilton et al. |
| 2012/0135743 A1 | 5/2012 | Ebiko et al. |
| 2013/0095845 A1 | 4/2013 | Lim et al. |
| 2013/0107864 A1 | 5/2013 | Lee et al. |
| 2013/0237231 A1 | 9/2013 | Nagaraja et al. |
| 2014/0031030 A1 | 1/2014 | Chou et al. |
| 2014/0321314 A1 | 10/2014 | Fodor et al. |
| 2015/0223069 A1* | 8/2015 | Solondz ............... H04W 12/08 370/329 |
| 2015/0245361 A1 | 8/2015 | Hughes et al. |
| 2017/0265187 A1 | 9/2017 | Chen et al. |

FOREIGN PATENT DOCUMENTS

| | | |
|---|---|---|
| EP | 2469911 A1 | 6/2012 |
| JP | 2007-129405 A | 5/2007 |
| JP | 2008-502272 A | 1/2008 |
| JP | 2010-050935 A | 3/2010 |
| JP | 2012-54879 A | 3/2012 |
| JP | 2014-039295 A | 2/2014 |
| KR | 10-2005-0116497 A | 12/2005 |
| WO | 2006/073225 A2 | 7/2006 |
| WO | 2010/146674 A1 | 12/2010 |
| WO | 2011/021388 A1 | 2/2011 |

OTHER PUBLICATIONS

International Search Report and Written Opinion of PCT Application No. PCT/JP2015/073284 dated Nov. 10, 2015, 18 pages.
International Preliminary Report on Patentability of PCT Application No. PCT/JP2015/073284 dated Apr. 27, 2017, 16 pages.
Seki et al., "Selection of Component Carriers Using Centralized Baseband Pooling for LTE-Advanced Heterogeneous Networks", IEICE Trans. Commun. vol. E96-B, No. 6, Jun. 2013, pp. 1288-1296.
Japanese Office Action dated Jun. 11, 2019, issued in corresponding Japanese Patent Application No. 2016-553998.

* cited by examiner

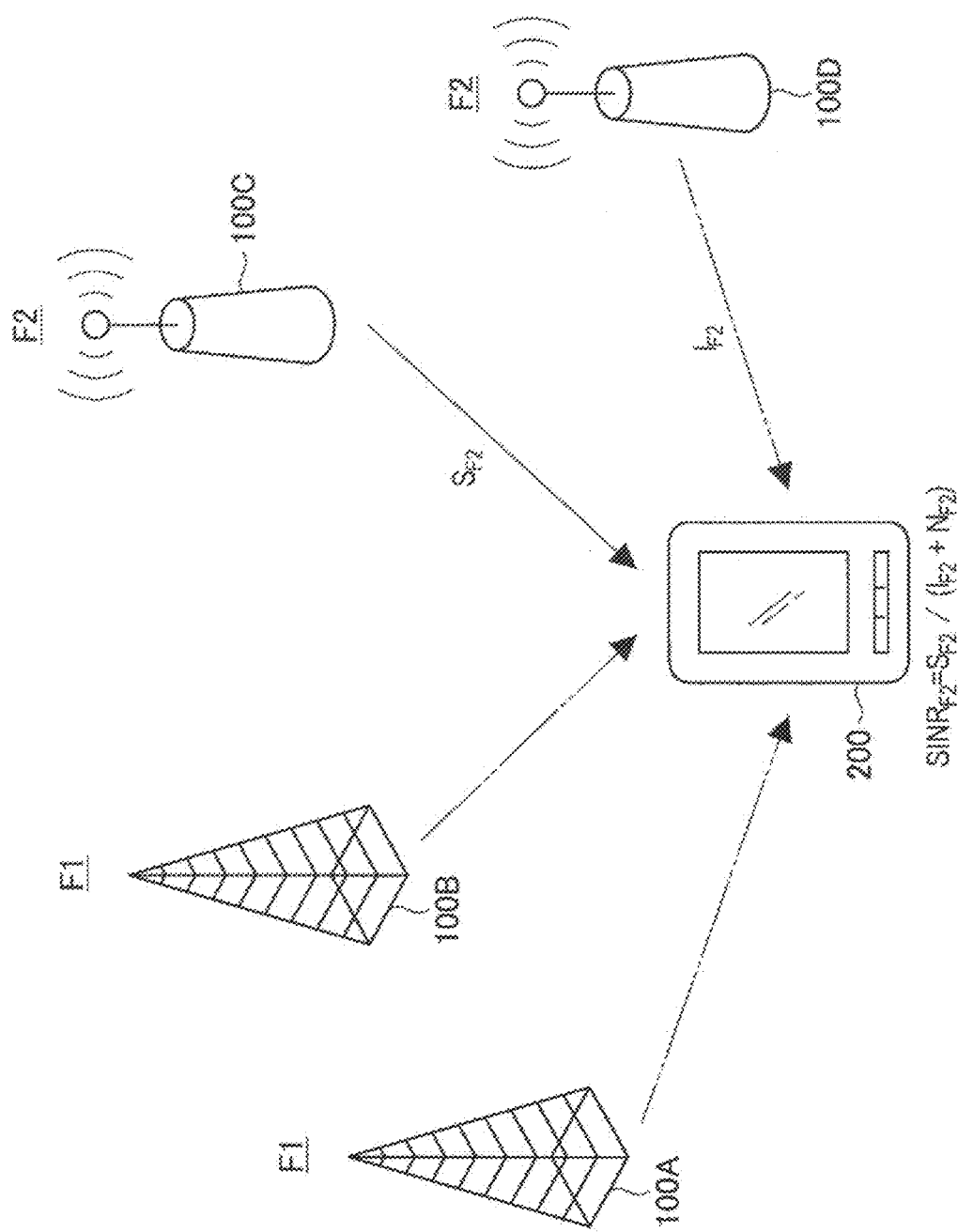

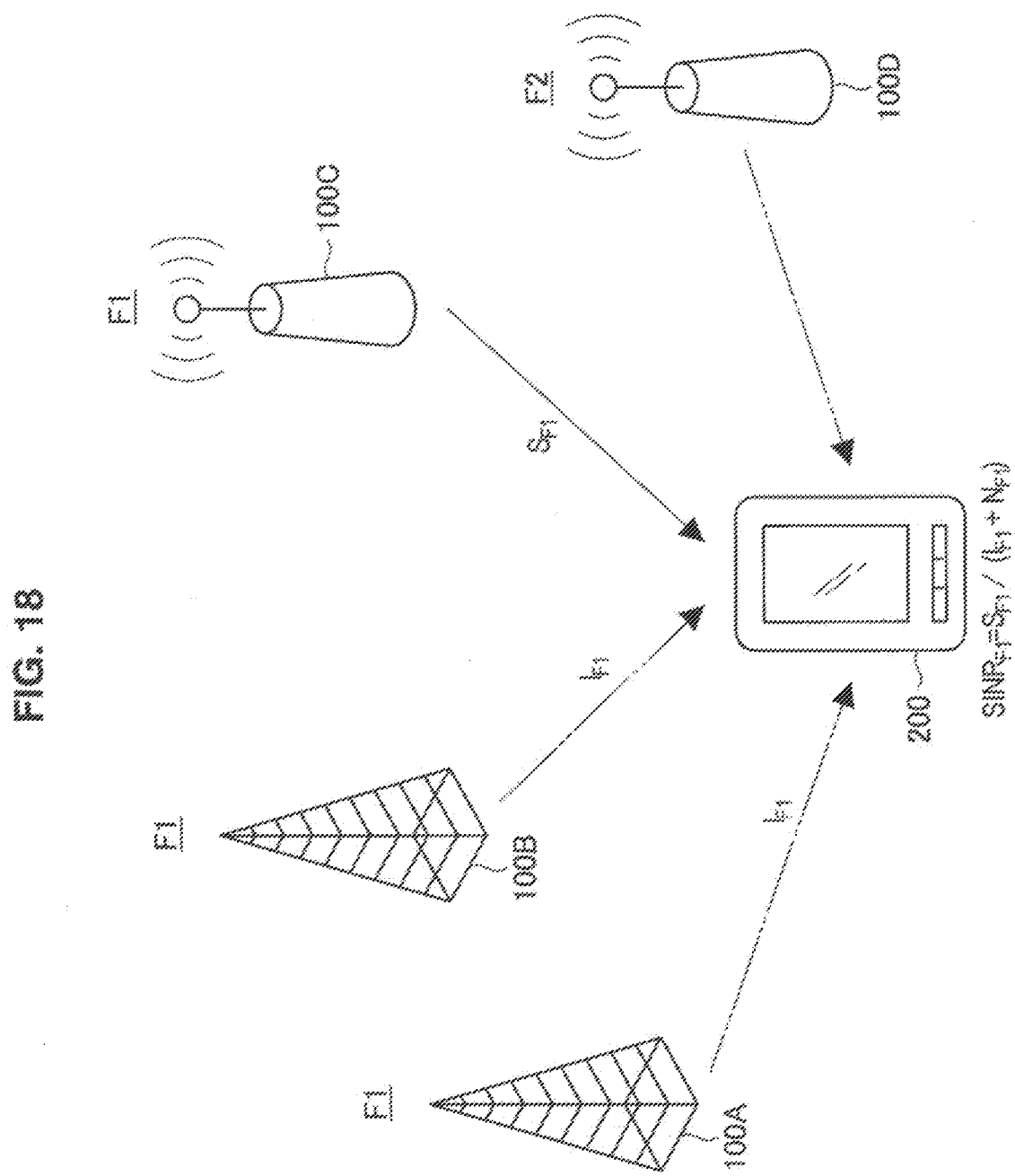

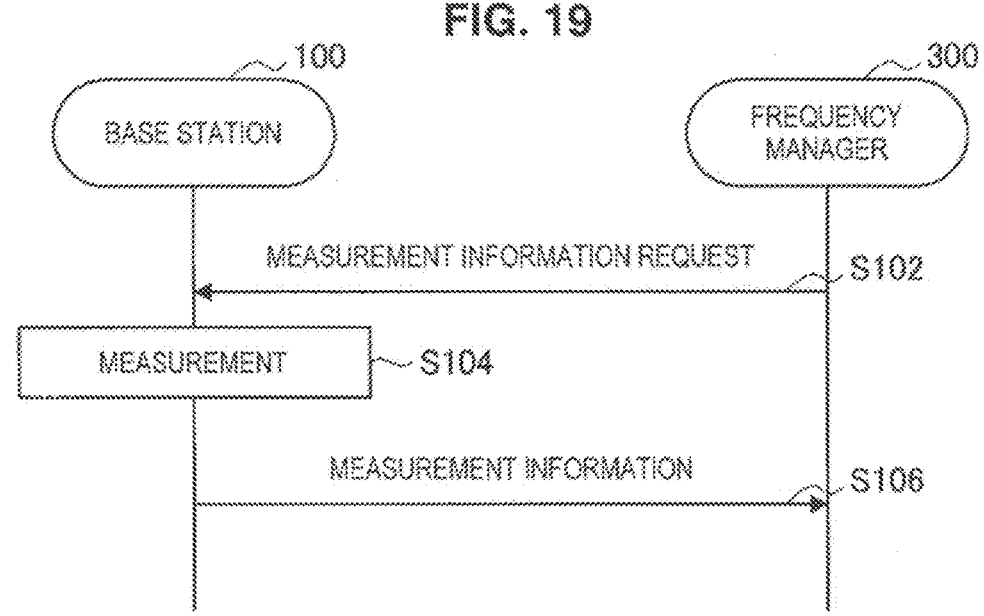
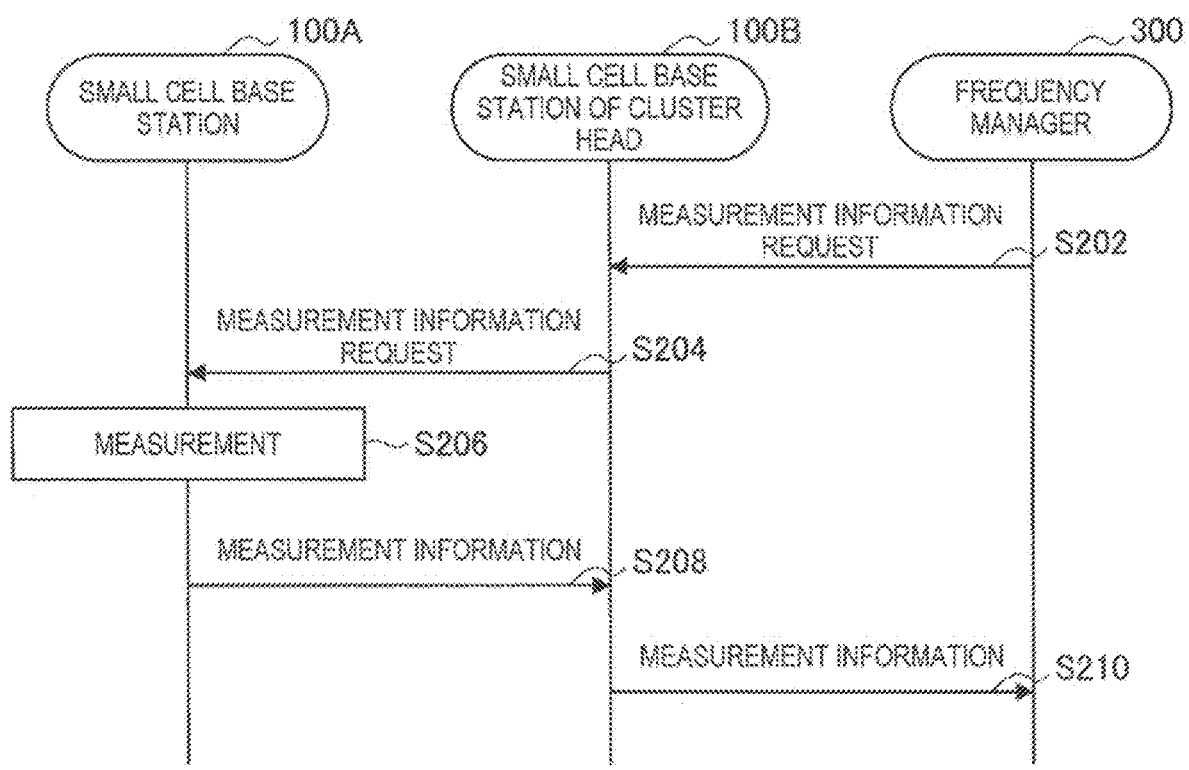

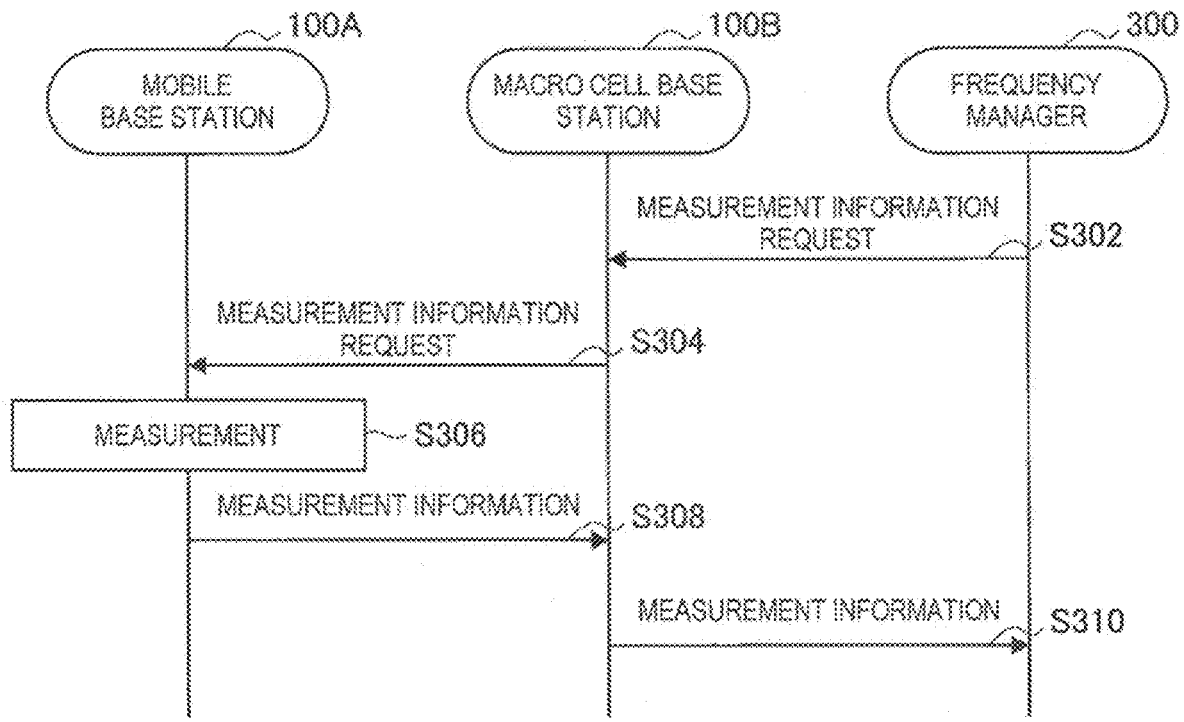
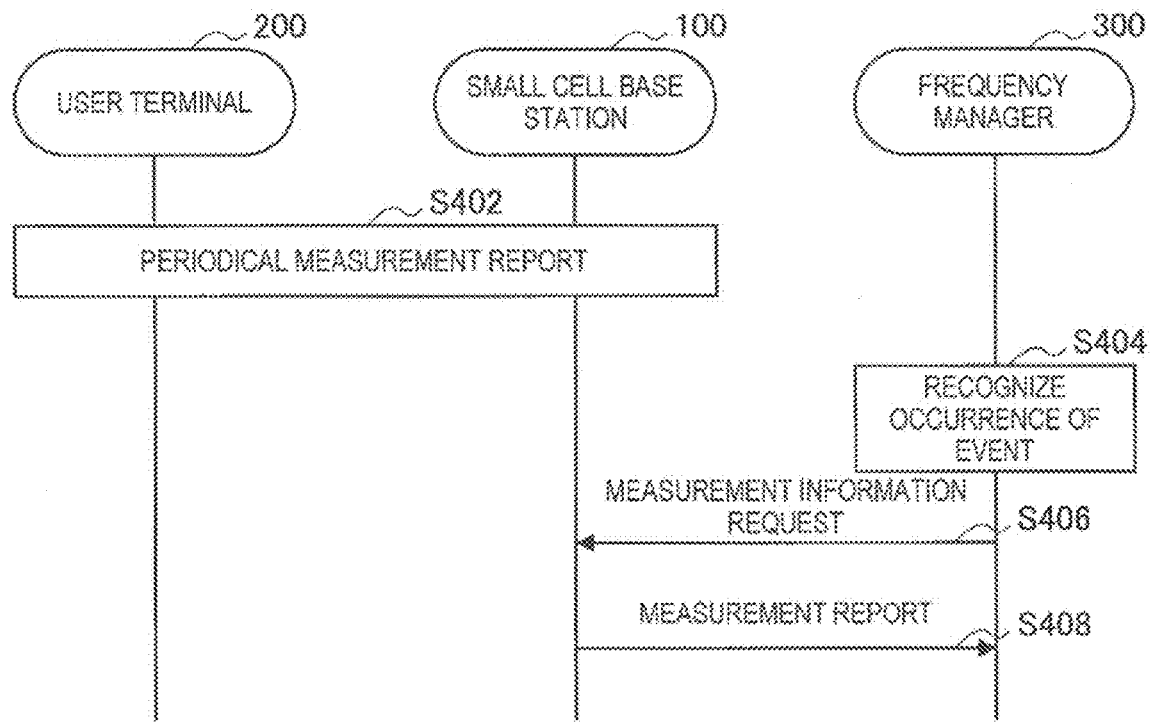

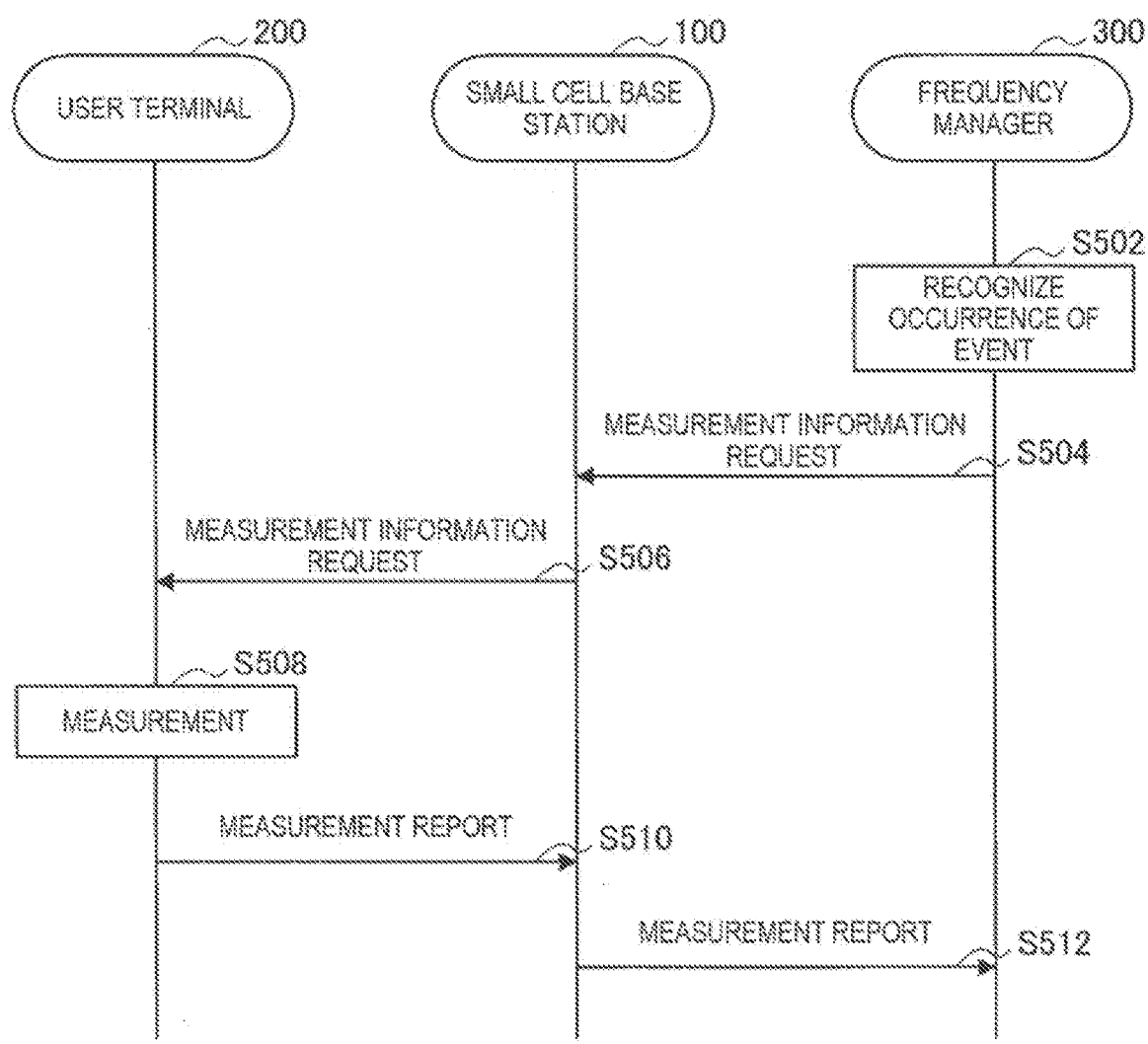

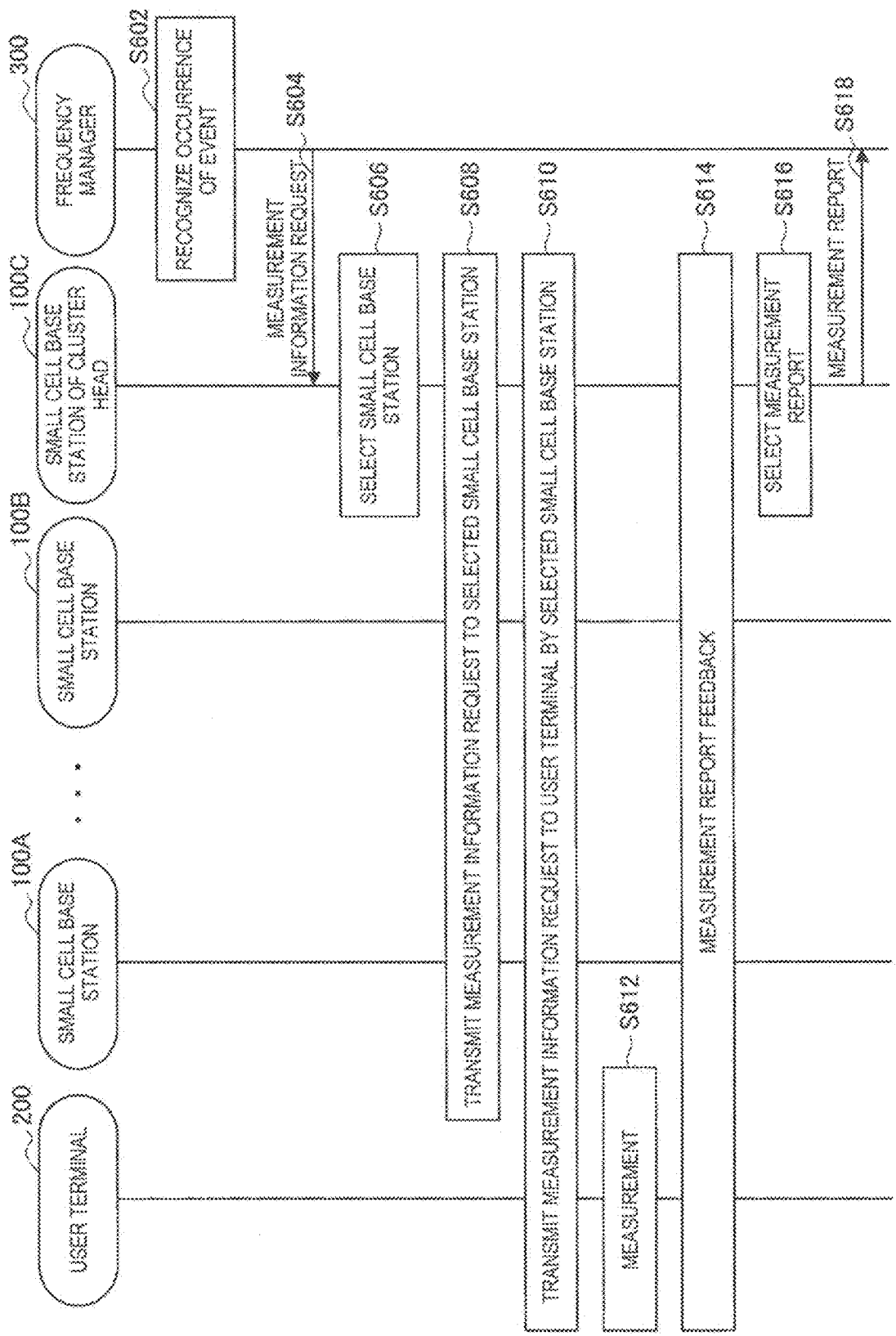

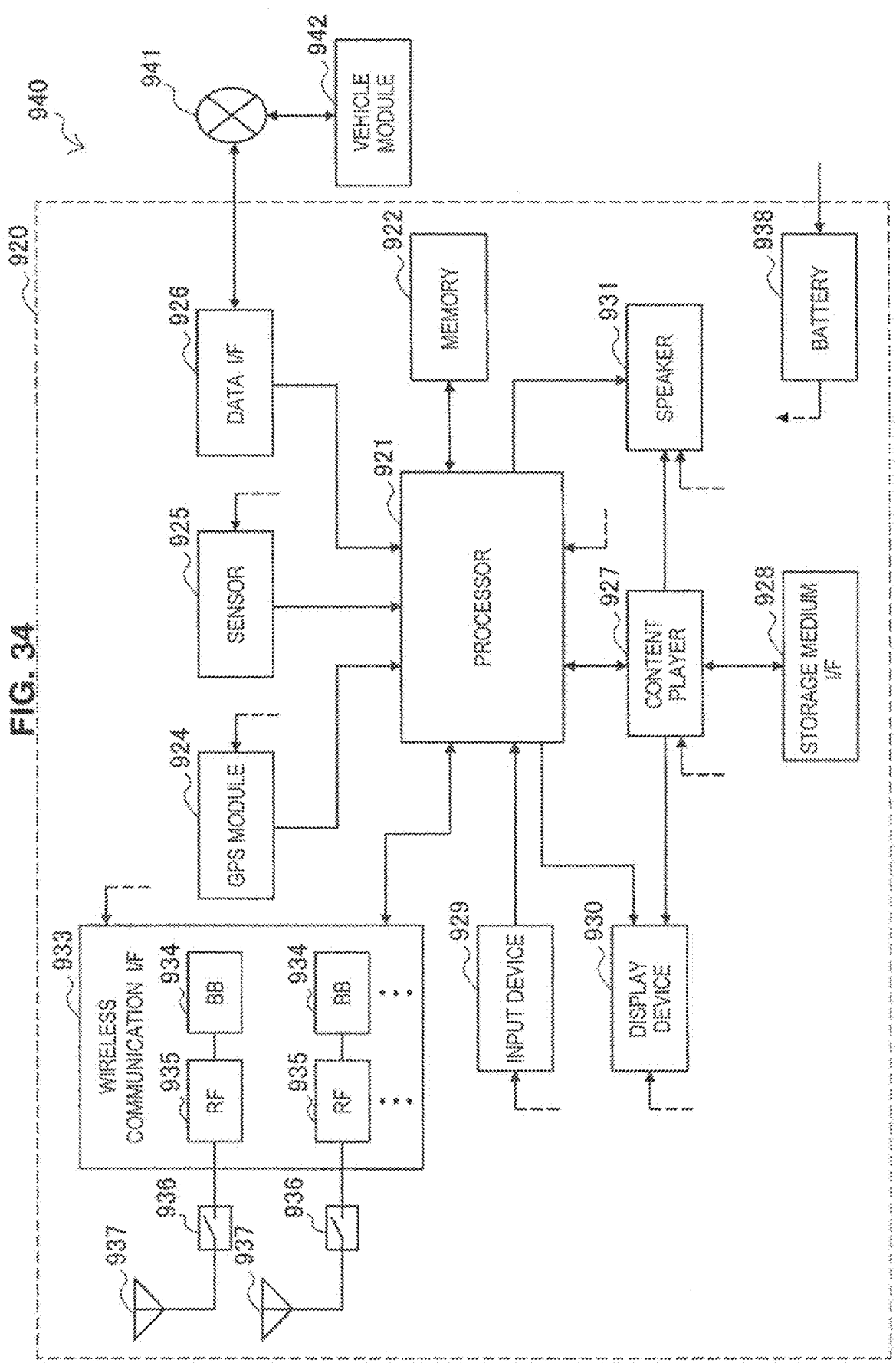

COMMUNICATION CONTROL DEVICE, AND COMMUNICATION CONTROL METHOD FOR DETERMINING A FREQUENCY RANGE TO BE USED BY A BASE STATION

CROSS-REFERENCE TO RELATED APPLICATIONS

This application is a continuation of U.S. application Ser. No. 16/515,054, filed Jul. 18, 2019, which is a continuation of U.S. application Ser. No. 16/111,986, filed Aug. 24, 2018 (now U.S. Pat. No. 10,397,806), which is a continuation of U.S. application Ser. No. 15/513,789, filed Mar. 23, 2017 (now U.S. Pat. No. 10,075,853), which is based on PCT filing PCT/JP2015/073284, filed Aug. 19, 2015, and claims priority to Japanese Application No. 2014-211359, filed Oct. 16, 2014, the entire contents of each are incorporated herein by reference.

TECHNICAL FIELD

The present disclosure relates to a communication control device, a base station, a terminal device, a communication control method, and a wireless communication method.

BACKGROUND ART

In recent years, wireless communication environments have faced the problem of rapid increases in data traffic. In this regard, in 3GPP, dispersion of traffic by installing a plurality of small cells in a macro cell and increasing a network density is defined. A technique of utilizing small cells in this way is referred to as "small cell enhancement."

The concept of a small cell can include different types of cells that are smaller than macro cells (for example, femtocells, nanocells, picocells, microcells, and the like) that are arranged separately or to overlap macro cells. In one example, a small cell is operated by a dedicated base station. In another example, a small cell is operated such that a terminal serving as a master device temporarily operates as a small cell base station. A so-called relay node can be regarded as a form of a small cell base station.

In order to cope with the rapid increases in data traffic, concentrating cells may be considered, but in this case, inter-cell interference may increase. When small cells are introduced, interference may occur between a small cell and a macro cell in addition to between small cells and between macro cells. Under such a communication environment, communication throughput in a user terminal (hereinafter, also referred to as "user throughput") can be reduced by interference, and thus a technique of preventing a decrease in user throughput is necessary. As an example of such a technique, a technique of utilizing a plurality of frequency bands in one wireless communication system or performing dynamic frequency control may be effective.

For example, in Patent Literature 1, a technique of performing a unidirectional handover of switching uplink (UL) communication from at least one UL component carrier on a first evolutional Node B (eNB) to a new UL component carrier on a second eNB is disclosed.

In Non-Patent Literature 1, an algorithm for allocating component carriers to a picocell or a remote radio head (RRH) including a plurality of RF units in LTE-A HetNet deployment is disclosed.

CITATION LIST

Patent Literature

Patent Literature 1: JP 2014-39295A

Non-Patent Literature

Non-Patent Literature 1: Hiroyuki Seki, Takaharu Kobayashi and Dai Kimura, "Selection of Component Carriers Using Centralized Baseband Pooling for LTE-Advanced Heterogeneous Networks," IEICE Transaction on Communications, Vol. E96-B, No. 6, JUNE 2013.

DISCLOSURE OF INVENTION

Technical Problem

However, in this technical field, further improvement in performance is desired. In this regard, the present disclosure proposes a communication control device, a base station, a terminal device, a communication control method, and a wireless communication method which are novel and improved and capable of improving user throughput by performing more flexible frequency control.

Solution to Problem

According to the present disclosure, there is provided a communication control device including: a communication unit configured to communicate with a base station of a wireless communication system in which one or more frequencies are used; a setting unit configured to set an event and set a frequency to be used by the base station using occurrence of the set event as a trigger; and an acquiring unit configured to acquire information for the setting by the setting unit.

According to the present disclosure, there is provided a base station including: a wireless communication unit configured to perform wireless communication with a terminal device using one or more frequencies; a communication unit configured to communicate with a communication control device configured to set an event; and a control unit configured to control the wireless communication unit such that a frequency set by the communication control device via the communication unit is used using occurrence of the event as a trigger.

According to the present disclosure, there is provided a terminal device including: a wireless communication unit configured to communicate with a base station of a wireless communication system in which one or more frequencies are used; and a control unit configured to perform control such that information used for setting a frequency to be used by the base station of the wireless communication system is transmitted to a communication control device via the wireless communication unit using occurrence of an event set by the communication control device as a trigger.

According to the present disclosure, there is provided a communication control method including: communicating with a base station of a wireless communication system in which one or more frequencies are used through a communication control device; and setting an event and setting a frequency to be used by the base station using occurrence of the set event as a trigger.

According to the present disclosure, there is provided a wireless communication method including: communicating with a base station of a wireless communication system in which one or more frequencies are used; and performing, by a processor, control such that information used for setting a frequency to be used by the base station of the wireless communication system is transmitted to a communication control device using occurrence of an event set by the communication control device as a trigger.

Advantageous Effects of Invention

As described above, according to the present disclosure, user throughput can be improved by performing more flexible frequency control.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is an explanatory diagram illustrating an example of a configuration of the wireless communication system according to the present embodiment.

FIG. 17 is an explanatory diagram for describing a change in a used frequency in a base station according to the present embodiment.

FIG. 18 is an explanatory diagram for describing a change in a used frequency in the base station according to the present embodiment.

FIG. 19 is a sequence diagram illustrating an example of a flow of a measurement information acquisition process performed in a wireless communication system according to the present embodiment.

FIG. 20 is a sequence diagram illustrating an example of a flow of a measurement information acquisition process performed in the wireless communication system according to the present embodiment.

FIG. 21 is a sequence diagram illustrating an example of a flow of a measurement information acquisition process performed in the wireless communication system according to the present embodiment.

FIG. 22 is a sequence diagram illustrating an example of a flow of a measurement information acquisition process performed in the wireless communication system according to the present embodiment.

FIG. 23 is a sequence diagram illustrating an example of a flow of a measurement information acquisition process performed in the wireless communication system according to the present embodiment.

FIG. 24 is a sequence diagram illustrating an example of a flow of a measurement information acquisition process performed in the wireless communication system according to the present embodiment.

FIG. 34 is a block diagram illustrating an example of a schematic configuration of a car navigation device.

MODE(S) FOR CARRYING OUT THE INVENTION

Figure 1:
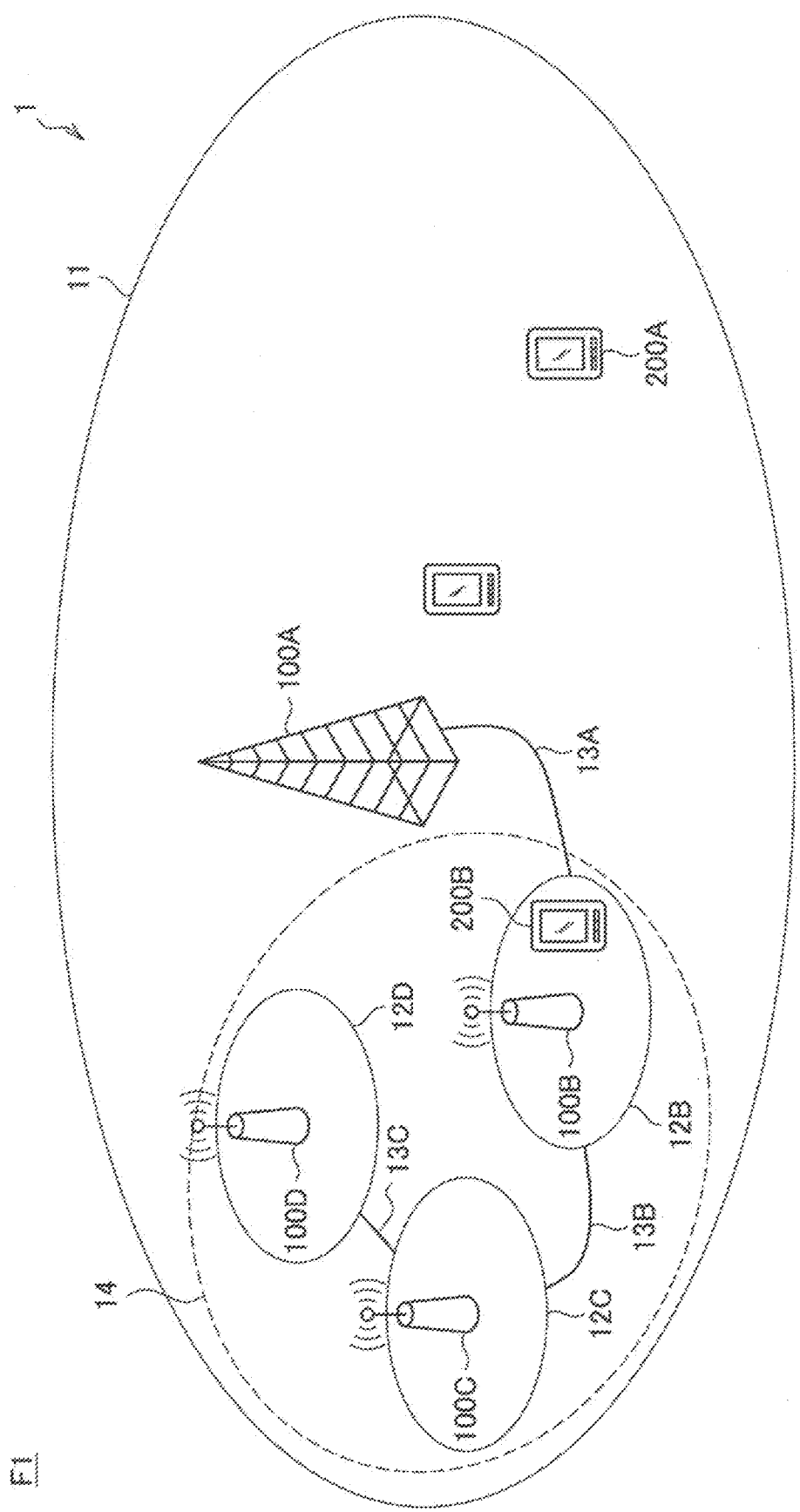
FIG. 1 is an explanatory diagram for describing a scenario assumed in an embodiment of the present disclosure.

Hereinafter, a preferred embodiment of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as base stations 100A, 100B, 100C, and so on as appropriate. On the other hand, when not particularly distinguishing each of multiple elements having substantially the same function and structure, only the same sign will be given. For example, the base stations 100A, 100B, 100C will be simply designated as the base station 100 when not being particularly distinguished.

Further, a description will proceed in the following order.
1. Introduction
1-1. Overview
1-2. Scenarios
2. Configuration
2-1. Overall configuration
2-2. Events
2-3. Signaling/message
2-4. Exemplary configuration of base station
2-5. Exemplary configuration of user terminal
2-6. Exemplary configuration of frequency manager
3. Operation processes
3-1. Measurement information acquisition process
3-2. Frequency setting process
4. Application examples
5. Conclusion

1. INTRODUCTION

[1-1. Overview]

In one embodiment of the present disclosure, in a wireless communication network in which one or more frequencies are used, a framework capable of flexibly adjusting frequency resources used by the base station is provided. In a wireless communication system according to the present embodiment, a base station dynamically switches carriers having different center frequencies and uses the carriers. In this specification, in order to simplify description, a base station is described as using at least one of a high frequency band (F1) and a low frequency band (F2). Further, a macro cell base station is described as using F1, and a small cell base station is described as using F1 or F2. At the time of implementation, a base station may use three or more frequencies. Further, a base station may use a frequency of a band at which coexistence/frequency sharing with other systems is performed. In both a macro cell base station and a small cell base station, the number of sectors (cells) is assumed to be 1. Of course, the preset technique is not limited to this example. F1 and F2 may be carriers belonging to the same band or carriers belonging to different bands. Further, in this specification, a carrier is assumed to be a component carrier (CC).

In a wireless communication system 1 according to the present embodiment, an event serving as a trigger for adjusting frequency resources used by a base station is newly defined and introduced. The wireless communication system 1 adjusts the frequency resources using the occurrence of the event as a trigger. The event can be arbitrarily defined and updated to realize a desired frequency control process according to a geographical environment in which a base station is installed, a radio wave environment, the development of a wireless communication technique, and the like. Here, in Patent Literature 1 and Non-Patent Literature 1, the event is not mentioned, nor is a detailed technique for adjusting frequency resources (for example, signaling, a protocol, or a technique related to a small cell cluster) disclosed.

On the other hand, a frequency resource adjustment technique is considered to correspond to, for example, activation/deactivation of a secondary cell (SCell) in carrier aggregation (CA) standardized in 3GPP. However, in carrier aggregation, a framework for promoting the coexistence of cells by preventing inter-cell interference is not provided. Further, carrier aggregation in which the same band as a wireless local area network (LAN) is used is currently under review. However, since this band is an unlicensed band, it is thought that interference will occur between cells formed by base stations owned by different service providers. Furthermore, when wireless LAN systems are mixed, it is thought that it will be difficult to secure communication quality. According to such circumstances, it is considered to be desirable to improve communication quality by implementing the frequency resource adjustment technique. Regarding a system (secondary system) in which secondary use of a frequency band is allowed such as licensed shared access (LSA) in Europe or a federal spectrum access system (SAS) in the United States, it is desirable to realize the coexistence between systems having the same priority and improve frequency utilization efficiency. In this regard, in the present embodiment, scenarios (scenarios 3, 1+2a/2b, and 3' to be described later) in which the frequency resources used by the base station are adjusted are assumed, and a detailed technique for adjusting frequency resources in such scenarios is provided.

The overview of the wireless communication system according to the present embodiment has been described above. Next, the scenarios assumed in the wireless communication system according to the present embodiment will be described.

[1-2. Scenarios]

First, as an example of an assumed scenario, a scenario based on the premise of use of a plurality of frequency bands defined by the small cell enhancement of 3GPP will be described with reference to FIGS. 1 to 4.

FIGS. 1 to 4 are explanatory diagrams for describing a scenario assumed in one embodiment of the present disclosure. First, components which are common in the wireless communication system 1 illustrated in FIGS. 1 to 4 will be described.

A base station 100A is a macro cell base station that operates a macro cell 11. The macro cell base station 100A provides a wireless communication service to one or more terminal devices (for example, a user terminal 200A in the example illustrated in FIG. 1) located in the macro cell 11. The macro cell 11 may be operated according to an arbitrary wireless communication scheme such as long term evolution (LTE), LTE-advanced (LTE-A), GSM (registered trademark), UMTS, W-CDMA, CDMA 200, WiMAX, WiMAX2, or IEEE 802.16.

The base stations 100B, 100C, and 100D are small cell base stations which operate small cells 10B, 10C, and 10D, respectively. The small cell base station 100 provides a wireless communication service to one or more terminal devices (for example, a user terminal 200B in the example illustrated in FIG. 1) located in a small cell 12. The small cell base station 100 establishes a backhaul link with the macro cell base station 100. For example, in the example illustrated in FIG. 1, the small cell base station 100B establishes a backhaul link 13A with the macro cell base station 100A.

The backhaul link may be a wired link or a wireless link. Further, the small cell base station 100 establishes an access link with one or more terminal devices in the small cell 12. The small cell base station 100 may be fixedly installed or may be a movable mobile device. The small cell base station 100 may be a terminal device equipped with hardware or software that enables it to be operated as a base station or a wireless access point. In this case, the small cell 12 is a dynamically formed localized network.

A plurality of small cell base stations can form a small cell cluster. For example, in the example illustrated in FIG. 1, the small cell base stations 100B, 100C, and 100D form a small cell cluster 14. The small cell base station 100 in the small cell cluster establishes a backhaul link for performing communication with the macro cell base station 100. For example, in the example illustrated in FIG. 1, the small cell base station 100B establishes a backhaul link 13B with the small cell base station 100C and relays communication performed between the macro cell base station 100A and the small cell base station 100C. In addition, the small cell base station 100C establishes a backhaul link 13C with the small cell 100D and relays the communication performed between the macro cell base station 100A and the small cell base station 100D. The backhaul link established in the small cell cluster may be a wired link or a wireless link. Further, each of the small cell base stations in the small cell cluster may establish a backhaul link with the macro cell base station.

The user terminal 200 is a terminal device that uses the wireless communication service provided from the base station 100. For example, the user terminal 200 may be a user equipment (UE) in LTE. The user terminal 200 may be located outdoors or may be located indoors. The user terminal 200 is not illustrated in FIGS. 2 to 4.

The components which are common in the wireless communication system 1 illustrated in FIGS. 1 to 4 have been described above. The respective scenarios will be described in detail below.

(Scenario 1)

FIG. 1 is an explanatory diagram for describing a scenario 1 assumed in one embodiment of the present disclosure. As illustrated in FIG. 1, in the wireless communication system 1 according to the present scenario, small cells 12B, 12C, and 12D are overlaid on the macro cell 11. Further, in the wireless communication system 1 according to the present scenario, the macro cell 11 and the small cells 12B, 12C, and 12D use the same frequency (F1). Further, in the wireless communication system 1 according to the present scenario, the small cells 12B, 12C, and 12D are arranged outdoors.

(Scenario 2a)

Figure 2:
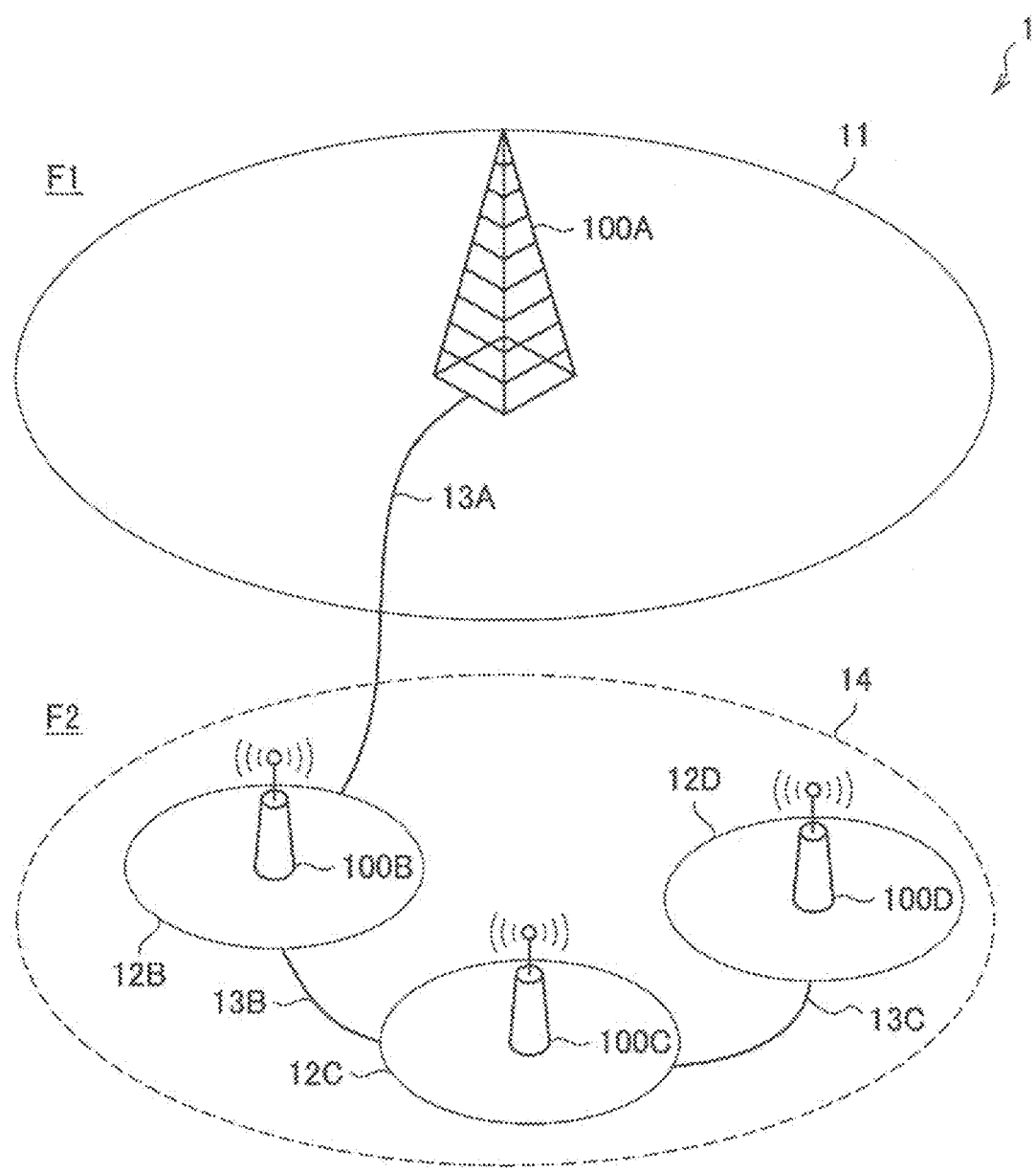
FIG. 2 is an explanatory diagram for describing a scenario assumed in an embodiment of the present disclosure.

FIG. 2 is an explanatory diagram for describing a scenario 2a assumed in one embodiment of the present disclosure. As illustrated in FIG. 2, in the wireless communication system 1 according to the scenario, small cells 12B, 12C, and 12D are overlaid on the macro cell 11. Further, in the wireless communication system 1 according to the present scenario, a macro cell 11 uses a low frequency band (F1), and the small cells 12B, 12C, and 12D use a high frequency band (F2). Further, in the wireless communication system 1 according to the present scenario, the small cells 12B, 12C, and 12D are arranged outdoors.

(Scenario 2b)

Figure 3:
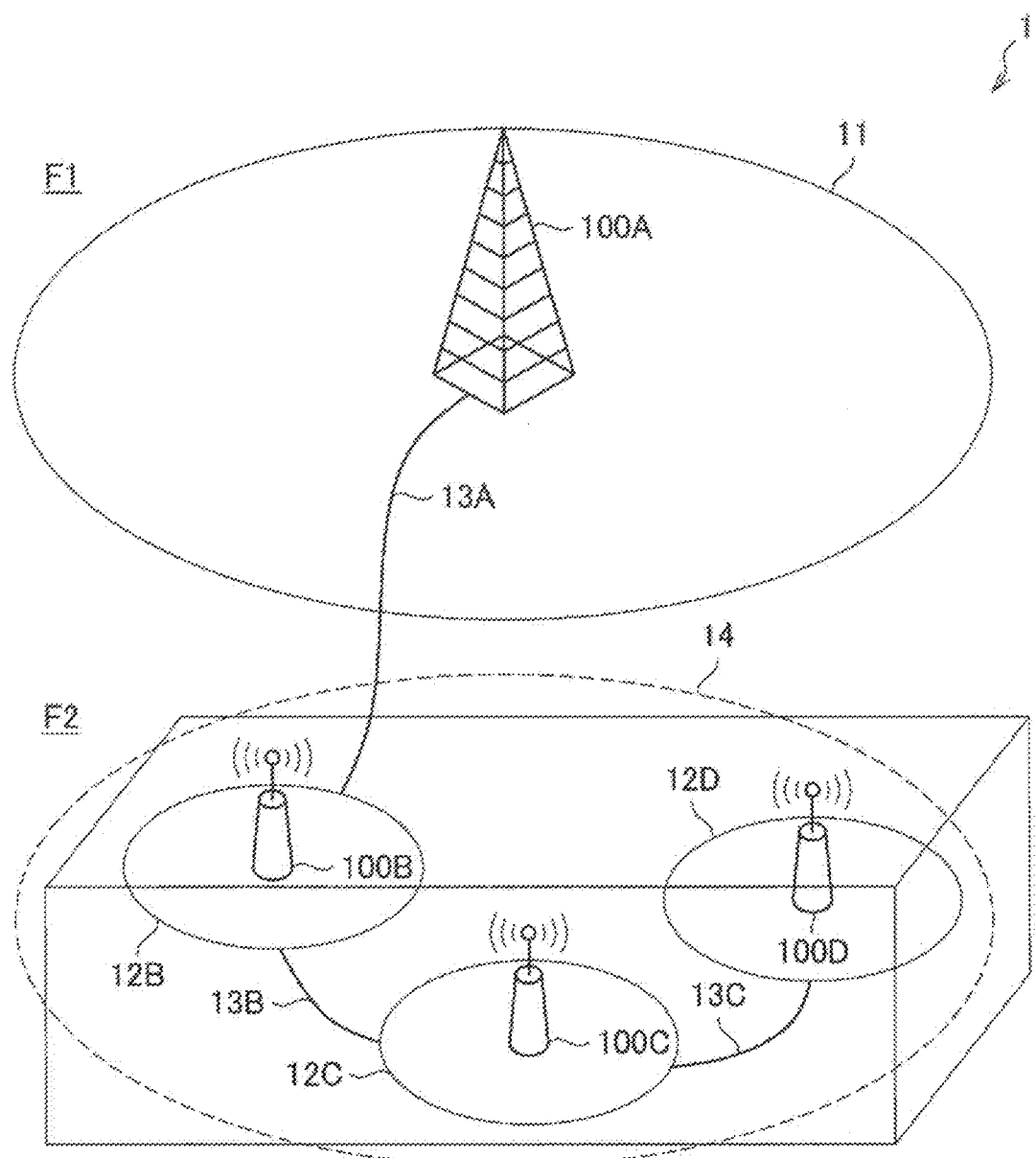
FIG. 3 is an explanatory diagram for describing a scenario assumed in an embodiment of the present disclosure.

FIG. 3 is an explanatory diagram for describing a scenario 2b assumed in one embodiment of the present disclosure. As illustrated in FIG. 3, in the wireless communication system 1 according to the scenario, small cells 12B, 12C, and 12D are overlaid on a macro cell 11. Further, in the wireless communication system 1 according to the present scenario, the macro cell 11 uses the low frequency band (F1), and the small cells 12B, 12C, and 12D use the high frequency band (F2). Further, in the wireless communication system 1 according to the present scenario, the small cells 12B, 12C, and 12D are arranged indoors.

(Scenario 3)

Figure 4:
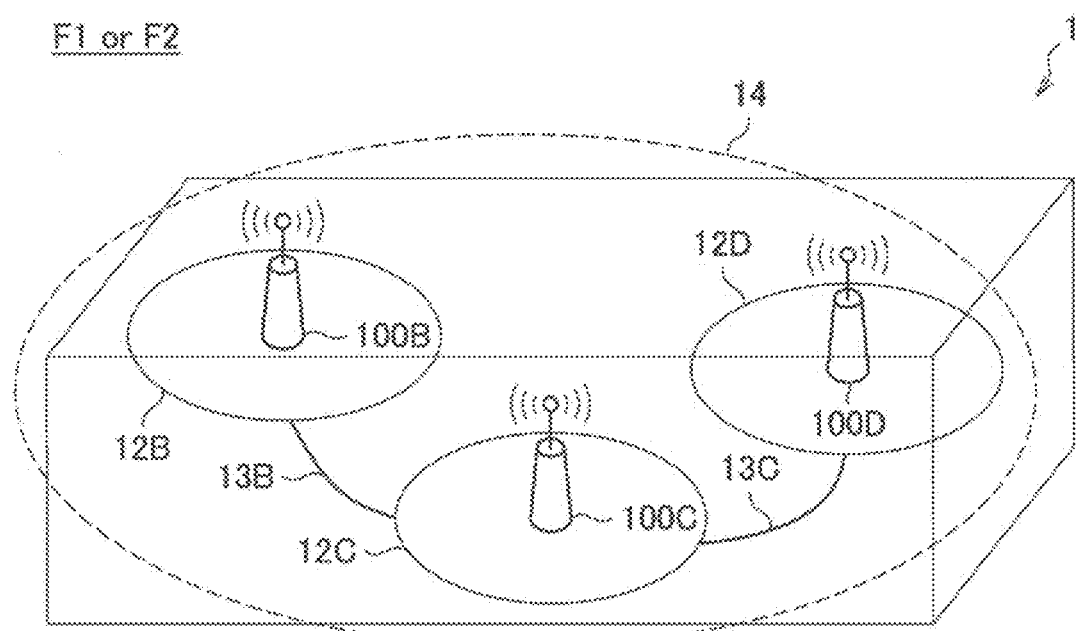
FIG. 4 is an explanatory diagram for describing a scenario assumed in an embodiment of the present disclosure.

FIG. 4 is an explanatory diagram for describing a scenario 3 assumed in one embodiment of the present disclosure. As illustrated in FIG. 4, in the wireless communication system 1 according to the present scenario, there is no macro cell 11, and there are small cells 12B, 12C, and 12D. Further, in the wireless communication system 1 according to the present scenario, the small cells 12B, 12C, and 12D use the low frequency band (F1) or the high frequency band (F2). Further, in the wireless communication system 1 according to the present scenario, the small cells 12B, 12C, and 12D are arranged indoors. The present scenario has not particularly discussed.

The four scenarios of the small cell enhancement defined in 3GPP have been described above.

Here, densification of small cells and offloading of user traffic to small cells in the future are anticipated. For this reason, it is considered that an adverse impact of interference between small cells on characteristics such as user throughput will increase. In this regard, in the present embodiment, in order to adjust frequency resources more flexibly and reduce such an adverse impact, the following two scenarios are further considered.

(Scenario 1+2a/2b)

The present scenario is a scenario in which the scenario 1 is combined with the scenario 2a or 2b. Specifically, in the wireless communication system 1 according to the present scenario, the small cell 12 is overlaid on the macro cell 11. Further, in the wireless communication system 1 according to the present scenario, the macro cell 11 uses the low frequency band (F1), and the small cell 12 dynamically switches a frequency band to be used to the low frequency band (F1) and/or the high frequency band (F2). The wireless communication system 1 according to the present scenario includes a frequency manager (control entity) for controlling the dynamic switching. The frequency manager may perform control for dynamically switching the frequency band used by the macro cell 11 in addition to the frequency band used by the small cell 12. Further, in the wireless communication system 1 according to the present scenario, the small cell 12 may be arranged indoors or may be arranged outdoors.

(Scenario 3')

The present scenario is a scenario obtained by changing the scenario 3 described above. In the wireless communication system 1 according to the present scenario, there is no macro cell 11, and there is a small cell 12. In wireless communication system 1 according to the present scenario, the small cell 12 dynamically switches the frequency band to be used to the low frequency band (F1) and/or the high frequency band (F2). The wireless communication system 1 according to the present scenario includes a frequency manager for controlling the dynamic switching. Further, in the wireless communication system 1 according to the present scenario, the small cell 12 may be arranged indoors or may be arranged outdoors.

The two new scenarios which are newly considered in the present embodiment have been described above. The two scenarios are scenarios including the four scenarios of small cell enhancement described above.

2. CONFIGURATION

[2-1. Overall Configuration]

Variations of an overall configuration of the wireless communication system 1 according to the present embodiment will be described with reference to FIGS. 5 to 13.

Figure 5:
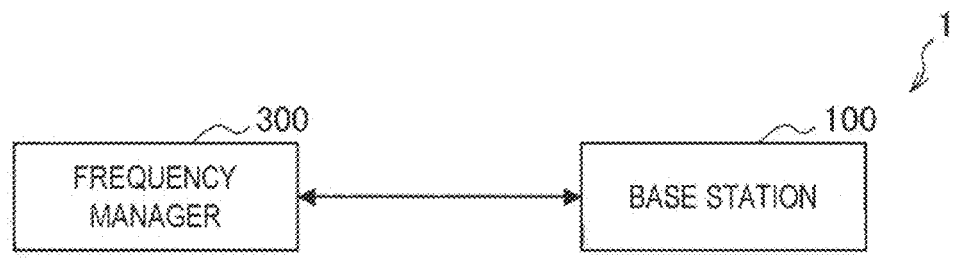
FIG. 5 is an explanatory diagram illustrating an example of a configuration of a wireless communication system according to the present embodiment.

FIG. 5 is an explanatory diagram illustrating an example of a configuration of the wireless communication system 1 according to the present embodiment. In the example illustrated in FIG. 5, the wireless communication system 1 has a frequency manager 300 and a base station 100. The base station 100 and the frequency manager 300 can be connected via a wired or wireless interface. The present exemplary configuration can be applied to the scenarios 3, 1+2a/2b, and 3'.

The frequency manager 300 is a communication control device having a function of flexibly adjusting the frequency resources used by the base station. The frequency manager 300 may be implemented as a logical entity and may be implemented with some function provided by, for example, the macro cell base station or the small cell base station. For example, the frequency manager 300 may be implemented as a physical entity or may be implemented as a server connected to a core network.

Figure 6:
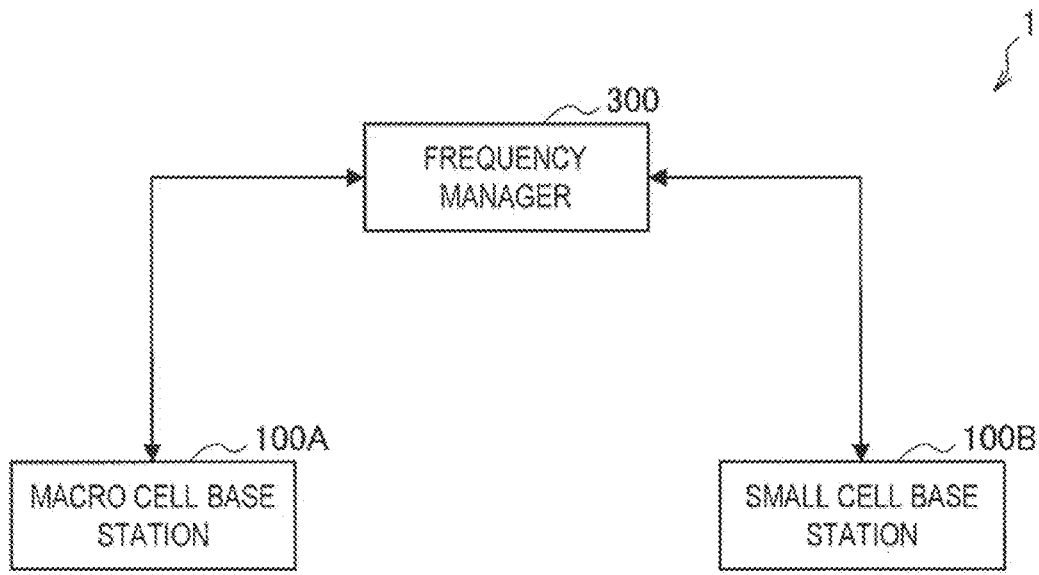
FIG. 6 is an explanatory diagram illustrating an example of a configuration of the wireless communication system according to the present embodiment.
Figure 7:
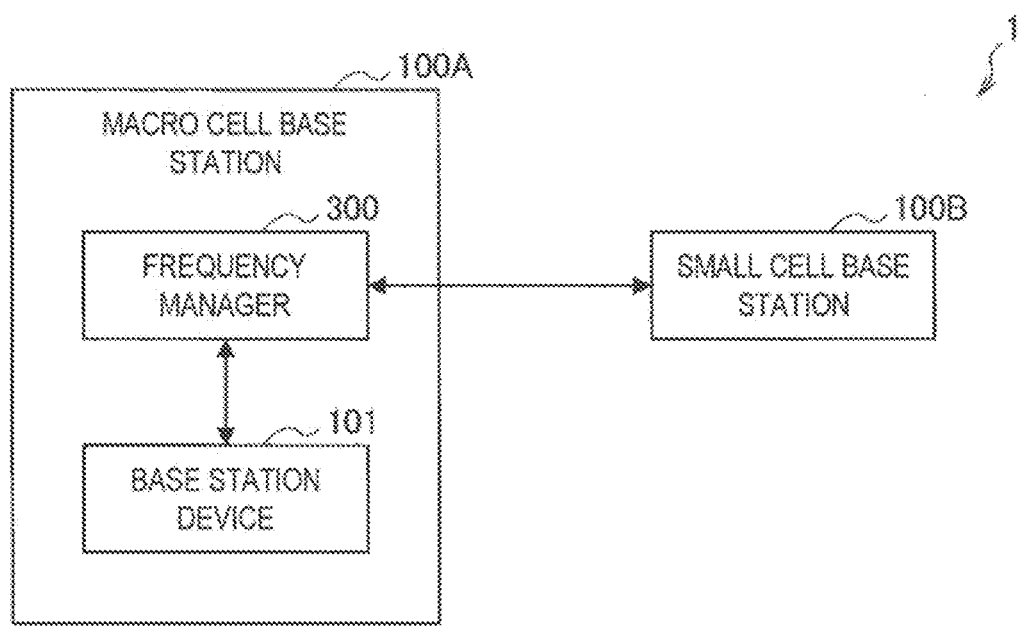
FIG. 7 is an explanatory diagram illustrating an example of a configuration of the wireless communication system according to the present embodiment.
Figure 6:
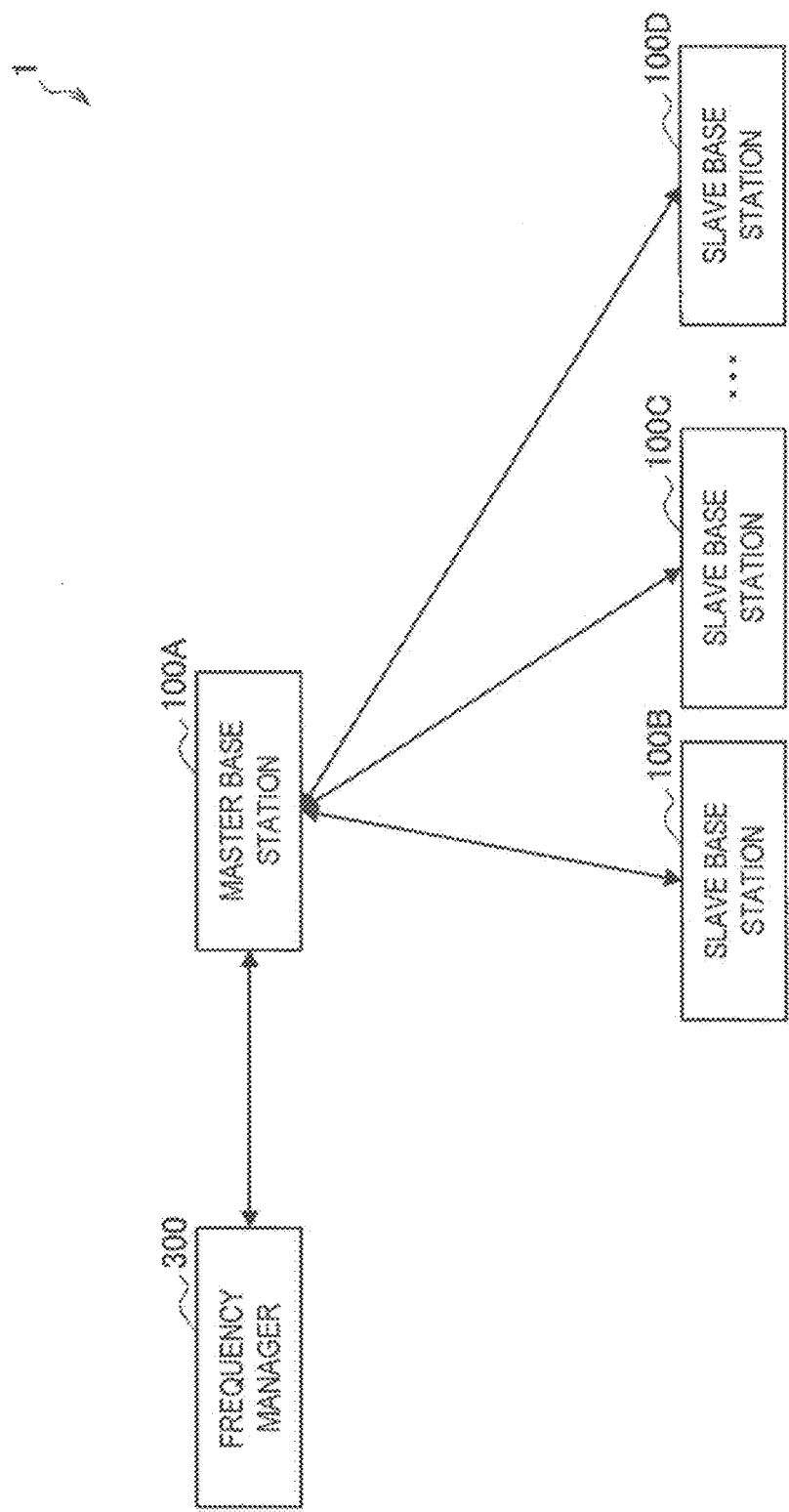

FIG. 6 is an explanatory diagram illustrating an example of a configuration of the wireless communication system 1 according to the present embodiment. In the example illustrated in FIG. 6, the wireless communication system 1 has a frequency manager 300, a macro cell base station 100A, and a small cell base station 100B. The frequency manager 300, the macro cell base station 100A, and the small cell base station 100B can be connected via a wired or wireless interface. The present exemplary configuration can be applied to the scenario 1+2a/2b FIG. 7 is an explanatory diagram illustrating an example of a configuration of the wireless communication system 1 according to the present embodiment. In the example illustrated in FIG. 7, a macro cell base station 100A has the function of the frequency manager 300 in the example illustrated in FIG. 6. The macro cell base station 100A has the function of the frequency manager 300 implemented as a logical entity in addition to a base station device 101 functioning as the macro cell base station. The present exemplary configuration can be applied to the scenario 1+2a/2b.

FIG. 8 is an explanatory diagram illustrating an example of a configuration of the wireless communication system 1 according to the present embodiment. In the example illustrated in FIG. 8, the wireless communication system 1 includes a frequency manager 300, a master base station 100A, and slave base stations 100B, 100C, . . . , and 100D. Here, the master base station is a base station having a function of controlling one or more slave base stations, and the slave base station is a base station operating under the control of the master base station. For example, the master base station may be a macro cell base station. In this case, the slave base station may be a small cell base station (including base stations such a picocell or a microcell). For example, the master base station may be a small cell base station having a function of a cluster head of a small cell cluster composed of a plurality of small cell base stations. In this case, the slave base station may be another small cell base station in the small cell cluster. The frequency manager 300 and the master base station 100A or the master base station 100A and the slave base stations 100B, 100C, . . . , and 100D can be connected via a wired or wireless interface. The present exemplary configuration can be applied to the scenarios 3, 1+2a/2b, and 3'.

Figure 9:
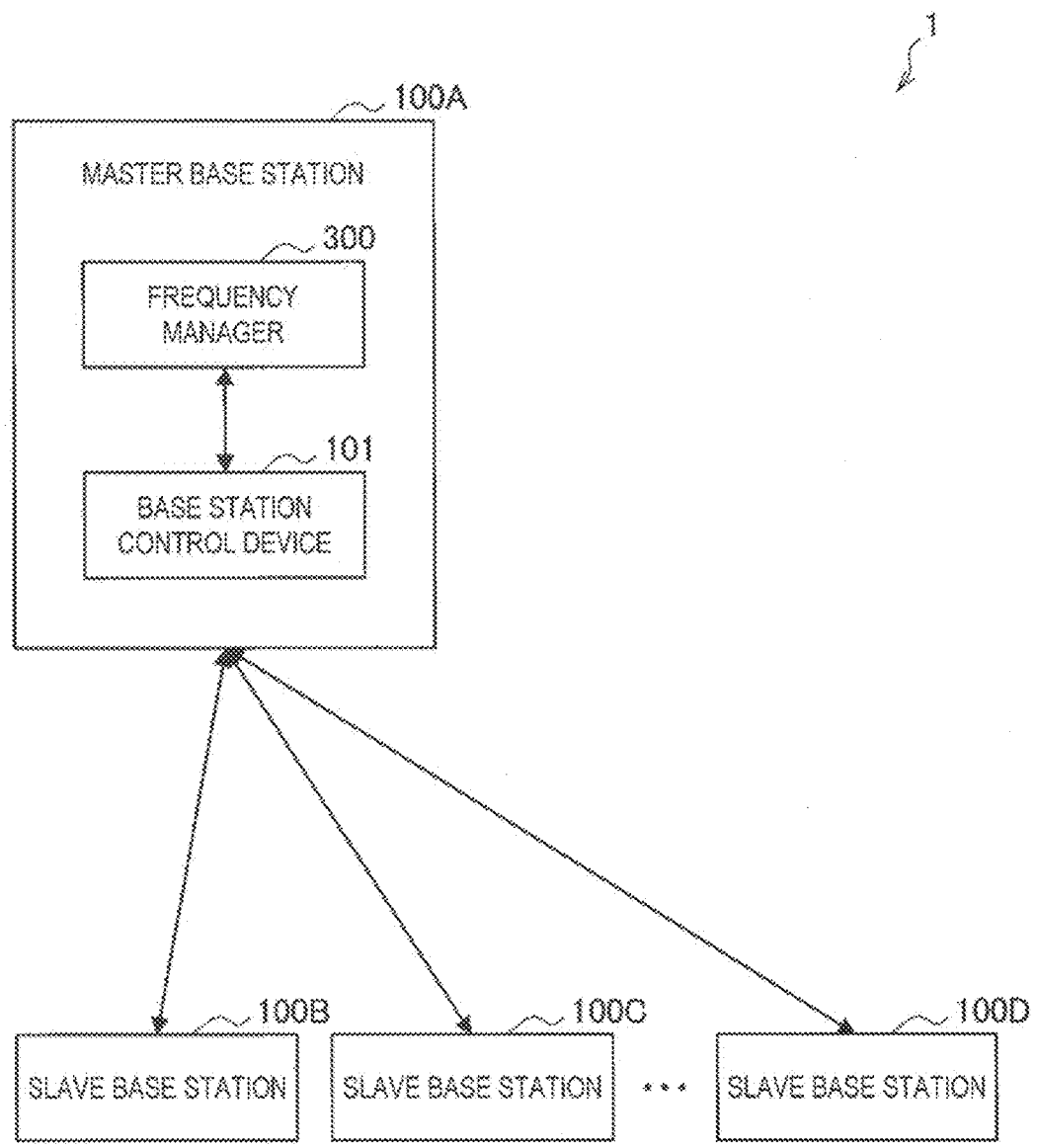
FIG. 9 is an explanatory diagram illustrating an example of a configuration of the wireless communication system according to the present embodiment.

FIG. 9 is an explanatory diagram illustrating an example of a configuration of the wireless communication system 1 according to the present embodiment. In the example illustrated in FIG. 9, a master base station 100A has the function of the frequency manager 300 in the example illustrated in FIG. 8. As illustrated in FIG. 9, the master base station 100A has the function of the frequency manager 300 implemented as a logical entity in addition to the base station device 101 functioning as a master base station. The present exemplary configuration can be applied to the scenarios 3, 1+2a/2b, and 3'.

Figure 10:
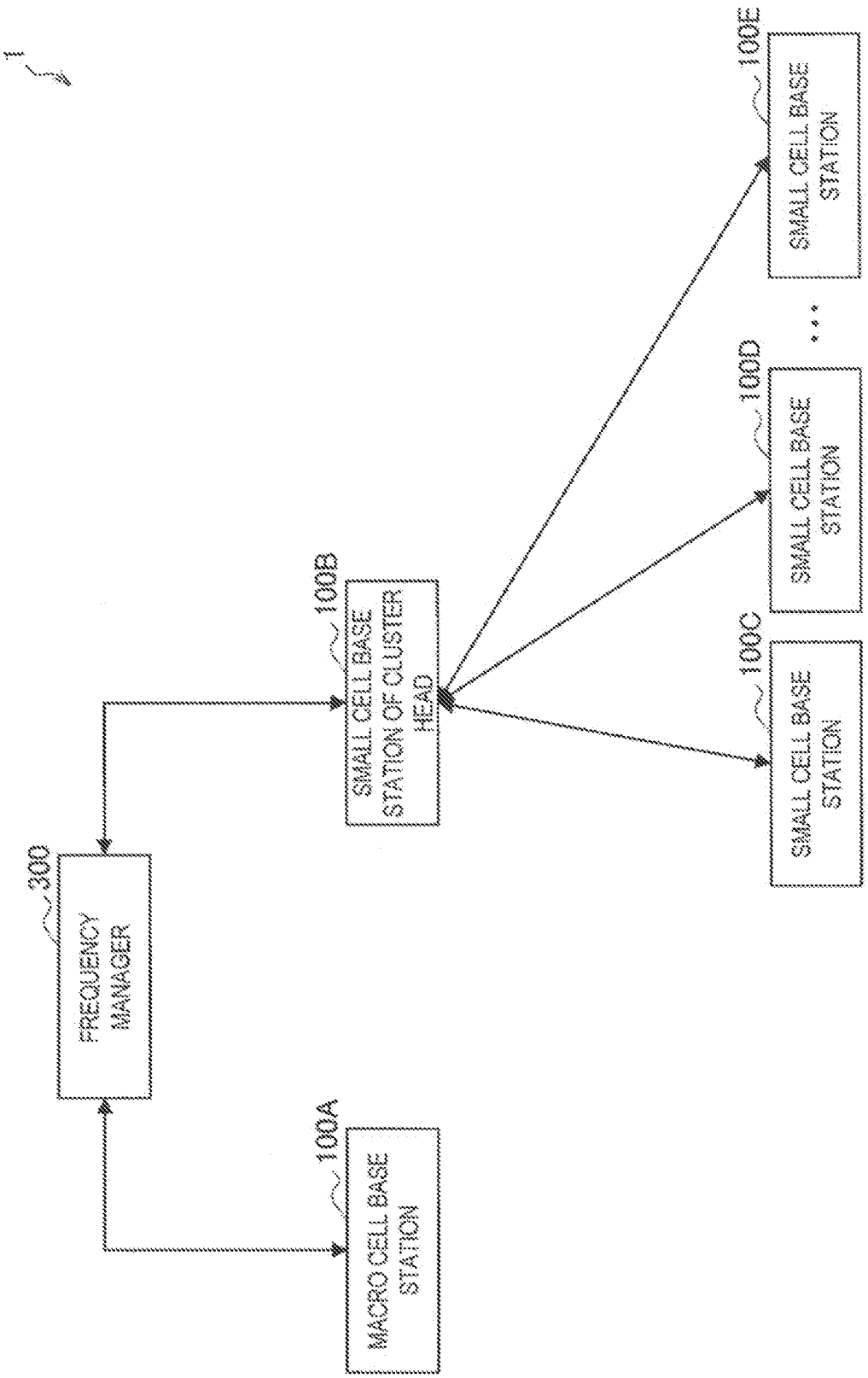
FIG. 10 is an explanatory diagram illustrating an example of a configuration of the wireless communication system according to the present embodiment.

FIG. 10 is an explanatory diagram illustrating an example of a configuration of the wireless communication system 1 according to the present embodiment. In the example illustrated in FIG. 10, the wireless communication system 1 includes a frequency manager 300, a macro cell base station 100A, a small cell base station 100B of a cluster head of a small cell cluster, and other small cell base stations 100C, 100D, . . . , and 100E in the small cell cluster. The frequency manager 300 adjusts the frequency resources with the macro cell which is adjacent to or overlaps the small cell cluster. In this case, as illustrated in FIG. 10, the small cell base station 100B of the cluster head may be representatively connected to the frequency manager 300. The frequency manager 300 and the macro cell base station 100A, the frequency manager 300 and the small manager base station 100B of the cluster head, or the small cell base station 100B of the cluster head and the other small cell base stations 100C, 100D, . . . and 100E in the small cell cluster may be connected via a wired or wireless interface. The present exemplary configuration can be applied to the scenario 1+2a/2b.

Figure 11:
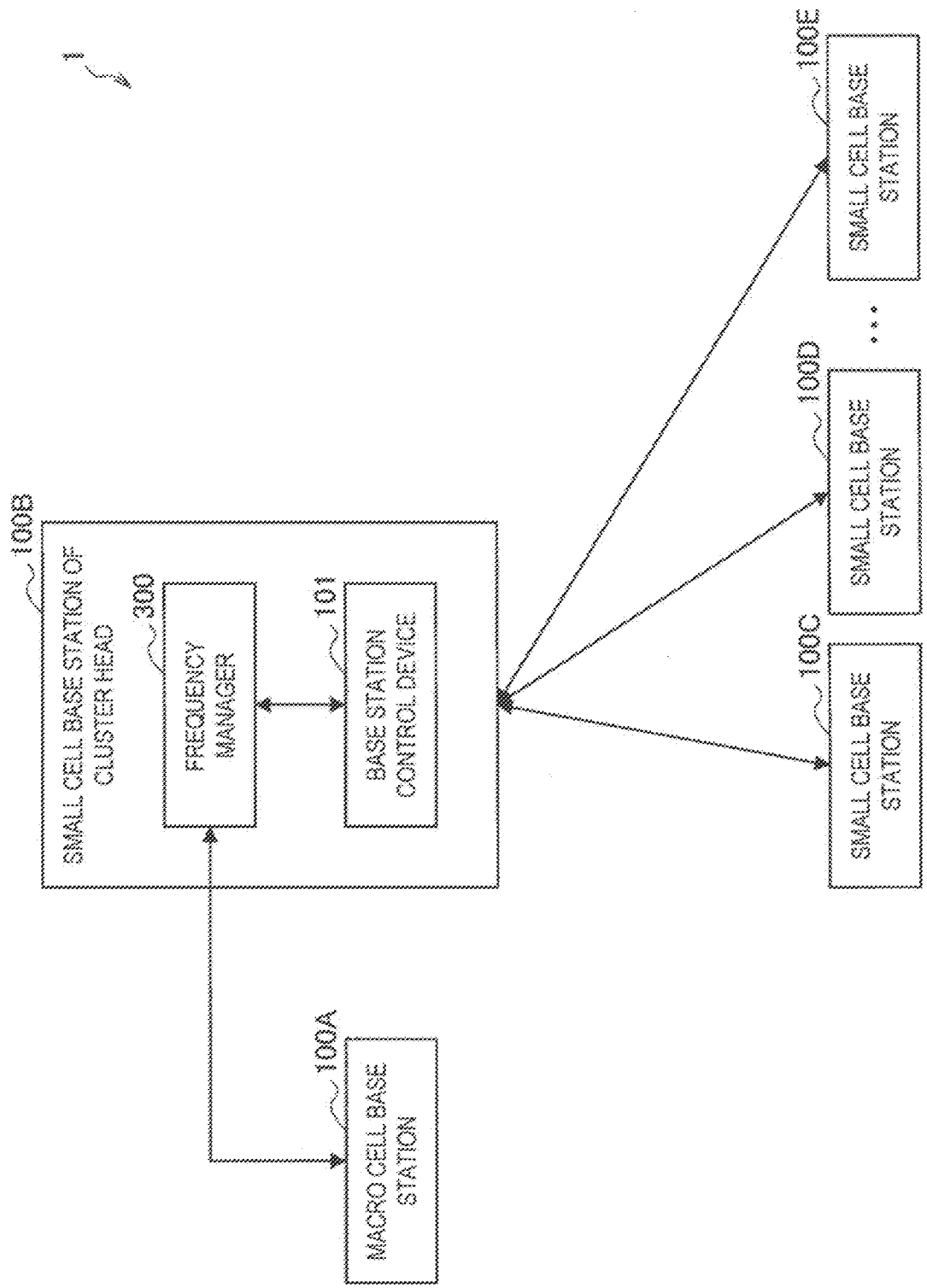
FIG. 11 is an explanatory diagram illustrating an example of a configuration of the wireless communication system according to the present embodiment.

FIG. 11 is an explanatory diagram illustrating an example of a configuration of the wireless communication system 1 according to the present embodiment. In the example illustrated in FIG. 11, a small cell base station 100B of a cluster head has the function of the frequency manager 300 in the example illustrated in FIG. 10. As illustrated in FIG. 11, the small cell base station 100B of the cluster head has the function of the frequency manager 300 implemented as a logical entity in addition to the base station device 101 functioning as a small cell base station of the cluster head. The present exemplary configuration can be applied to the scenario 1+2a/2b.

Figure 12:
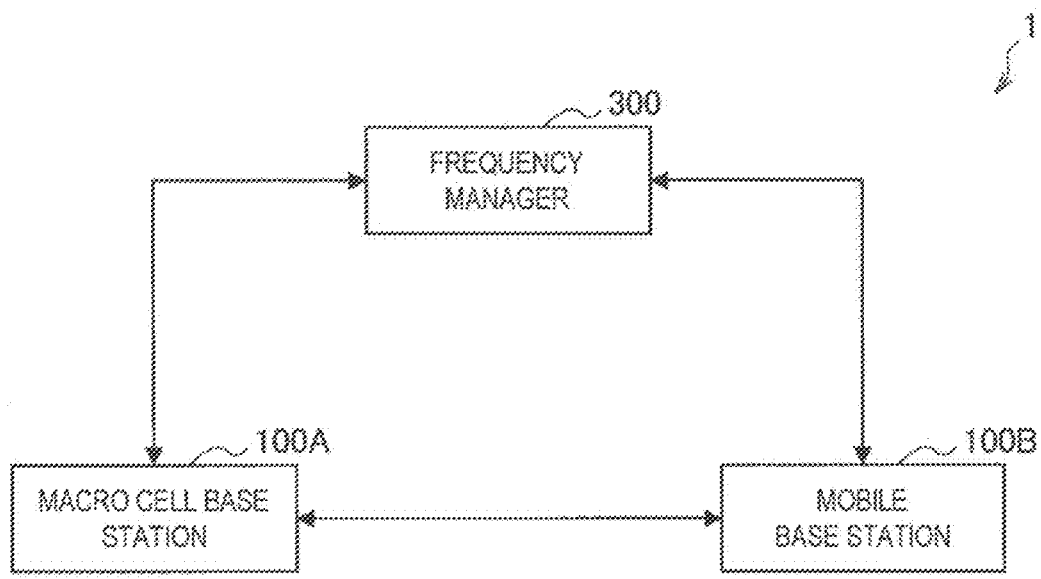
FIG. 12 is an explanatory diagram illustrating an example of a configuration of the wireless communication system according to the present embodiment.

FIG. 12 is an explanatory diagram illustrating an example of a configuration of the wireless communication system 1 according to the present embodiment. In the example illustrated in FIG. 12, the wireless communication system 1 includes a frequency manager 300, a macro cell base station 100A, and a mobile base station 100B. The mobile base station 100B is, for example, a user terminal 200 that temporarily operates as a small cell base station. The mobile base station 100B can move dynamically. The mobile base station 100B may be a so-called moving cell or may be installed on a moving body such as a bus or a train. In this case, the frequency manager 300 adjusts the frequency resources with a macro cell or a small cell which is adjacent to or overlaps the moving cell according to the position of the mobile base station 100B. The frequency manager 300, the macro cell base station 100A, and the mobile base station 100B can be connected by a wired or wireless interface. For example, the frequency manager 300 may be connected to the mobile base station 100B via the macro cell base station 100A. In addition, the frequency manager 300 may be connected to the macro cell base station 100A via the mobile base station 100B. The present exemplary configuration can be applied to the scenario 1+2a/2b.

Figure 13:
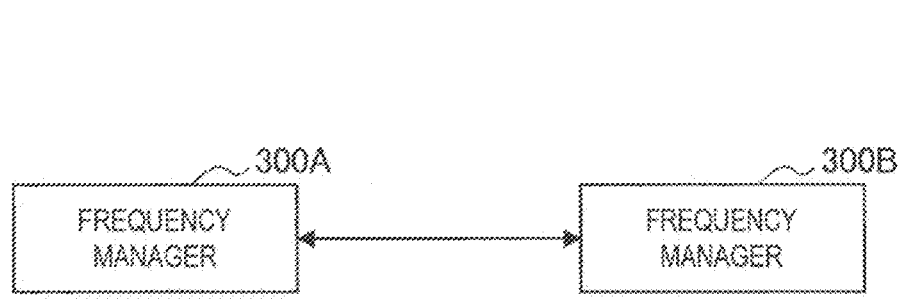
FIG. 13 is an explanatory diagram illustrating an example of a configuration of the wireless communication system according to the present embodiment.

FIG. 13 is an explanatory diagram illustrating an example of a configuration of the wireless communication system 1 according to the present embodiment. In the example illustrated in FIG. 13, the wireless communication system 1 includes a frequency manager 300A and a frequency manager 300B. A plurality of frequency managers 300 may exchange information in order to adjust the frequency resources of the base station 100 to be controlled. The frequency manager 300A and the frequency manager 300B can be connected by a wired or wireless interface. The present exemplary configuration can be applied to the scenarios 3, 1+2a/2b, and 3'.

The variations of the overall configuration of the wireless communication system 1 according to the present embodiment have been described above.

[2-2. Events]

Next, specific examples of the event will be described. The event is set by a setting unit 335 to be described later. Hereinafter, a small cell serving as a frequency resource adjustment target is also referred to as a "target small cell," and the other small cells are also referred to as "neighbor small cells." Further, a small cell cluster serving as a frequency resource adjustment target is also referred to a "target small cell cluster," and the other small cell clusters are also referred to as "neighbor small cell clusters."

For example, the event may include arrival of a preset time. As an example, the following event 1 may be defined.

(Event 1: Arrival of Frequency Maintenance Time)

The present event is arrival of a frequency maintenance time. A frequency maintenance cycle $T_{F\text{-}maintenance}$ may be arbitrarily set. Here, "frequency maintenance" may also include a review of periodic frequency license renewal. In this case, the frequency maintenance period may be defined by a license period. The present event may occur in the scenarios 3, 1+2a/2b, and 3'.

For example, the event may include the fact that the base station belonging to the wireless communication system 1 starts or stops use of a frequency. As an example, the following events 2 to 5 may be defined.

(Event 2: ON→OFF of Neighbor Small Cell)

The present event is transition of a neighbor small cell to a sleep mode. By defining the present event, when a frequency used by a target small cell is different from a frequency used by a neighbor small cell, the target small cell can use the frequency used by the neighbor small cell that has transitioned to the sleep mode.

(Event 3A-1: OFF→ON of Target Small Cell)

The present event is return of the target small cell from the sleep mode. A frequency use state, that is, the magnitude of inter-cell interference occurring with a neighbor small cell or a macro cell, may change when the target small cell transitions to the sleep mode or returns from the sleep mode. By defining the present event, appropriate frequency resource adjustment according to the change of the frequency use state is implemented.

(Event 3A-2: OFF→ON of Neighbor Small Cell)

The present event is return of the neighbor small cell from the sleep mode. When the neighbor small cell returns from the sleep mode, interference from the neighbor small cell to the user terminal 200 in the target small cell may increase. By defining the present event, appropriate frequency resource adjustment according to the interference from the neighbor small cell is implemented.

(Event 3B-1: OFF→ON of Small Cell in Target Small Cell Cluster)

The present event is return of one or more small cells in the target small cell cluster from the sleep mode. When the small cell in the target small cell cluster returns from the sleep mode, an inter-cell interference state within the cluster may change. By defining the present event, appropriate frequency resource adjustment according to the change in the inter-cell interference state within the cluster is implemented.

(Event 3B-2: OFF→ON of Small Cell in Neighbor Small Cell Cluster)

The present event is return of one or more small cells in the neighbor small cell cluster from the sleep mode. When the small cell in the neighbor small cell cluster returns from the sleep mode, an inter-cluster interference state may change. By defining the present event, appropriate frequency resource adjustment according to the change in the inter-cluster interference state is implemented.

(Event 3C-1: ON→OFF of Small Cell in Target Small Cell Cluster)

The present event is transition of one or more small cells in the target small cell cluster to the sleep mode. When the small cell in the target small cell cluster transitions to the sleep mode, the inter-cell interference state within the cluster may change. By defining the present event, appropriate frequency resource adjustment according to the change in the inter-cell interference state within the cluster is implemented.

(Event 3C-2: ON→OFF of Small Cell in Neighbor Small Cell Cluster)

The present event is transition of one or more small cells in the neighbor small cell cluster to the sleep mode. When the small cell in the neighbor small cell cluster transitions to the sleep mode, the inter-cluster interference state may change. By defining the present event, appropriate frequency resource adjustment according to the change in the inter-cluster interference state is implemented.

The events 2 to 3C-2 may occur in the scenarios 3, 1+2a/2b, and 3'.

(Event 4: Handover of UE to Target Small Cell)

The present event is selection of the user terminal 200 whose serving cell is the macro cell or the neighbor small cell of the target small cell as a handover destination. When the user terminal 200 is newly handed over to the target cell, the interference state within the cell or between the cells may change. By defining the present event, adjustment of appropriate frequency resources according to the change in the interference state within or between the cells is implemented. The present event may occur in the scenarios 3, 1+2a/2b, and 3'.

(Event 5: Activation/Deactivation of SCell of CA by Neighbor Cell)

The present event is activation or deactivation of the SCell by the neighbor cell. When the target small cell, the neighbor small cell, or the macro cell activates or deactivates the SCell, the interference state within the cell or between the cells may change. By defining the present event, appropriate frequency resource adjustment according to the change in the interference state within or between the cells is implemented. The present event may occur in the scenarios 3, 1+2a/2b, and 3'.

The specific examples of the event related to the stop and the start of the use of the frequency by the base station have been described above. In addition, various events can be considered. Examples thereof will be described below.

(Event 6: Switching of Terminal Device Base Station Mode)

The present event is switching of the user terminal 200 belonging to the wireless communication system 1 to a base station mode. By defining the present event, it is possible to perform an initial setting of a frequency used when the user terminal 200 switches to the base station mode and operates as a mobile base station. The present event may occur in the scenario 1+2a/2b.

(Event 7: Measurement Report on Inter-Frequency Measurement)

The present event is acquisition of a measurement report on inter-frequency measurement by the user terminal 200 belonging to the wireless communication system 1. By defining the present event, appropriate frequency resource adjustment according to influence from a neighbor small cell or a macro cell using a different frequency from the target small cell to the user terminal 200 is implemented. The present event may occur in the scenarios 3, 1+2a/2b, and 3'.

(Event 8: Occurrence of Request to Protect High Priority System)

The present event is determination indicating that protection of other wireless communication systems with higher priority than the wireless communication system 1 is not sufficient. For example, the small cell is considered to use the same frequency band as frequency resources used by a high priority system which is given priority in federal SAS in the United States, for example, the frequency resources used by satellites or users associated with federal government (federal users). In this case, in order to realize the protection of the high priority system, it is desirable to change the frequency used by the small cell. By defining the present event, it is possible to realize protection of other wireless communication systems with higher priority than the wireless communication system 1. As a system that can be a high priority system, for example, in addition to a wireless communication system in which wireless communication is performed, a system using radio waves such as a radar system is considered. The present event can occur in the scenarios 3, 1+2a/2b, and 3'.

(Event 9: Occurrence of Coverage Hole)

The present event is the occurrence of a coverage hole in an area of a cluster composed of one or more cells included in the wireless communication system 1. Depending on an ON/OFF state of the small cell or the inter-cell interference state, a coverage hole which is an area in which the user terminal 200 fails to perform communication or communication quality is poor may occur in the cluster area. This can happen even when a wide area is covered by the macro cell. Such a coverage hole can be improved when frequencies used by the cells in the cluster are changed. By defining the present event, appropriate frequency resource adjustment for improving the coverage hole is implemented. The present event may occur in the scenarios 3, 1+2a/2b, and 3'.

The specific examples of the event have been described above. Next, signaling/message for notifying of the occurrence of an event in the wireless communication system 1 will be described.

[2-3. Signaling/Message]

The frequency manager 300 typically recognizes the occurrence of an event through signaling or a message from the base station 100 or the like. In the example illustrated in FIG. 13, the frequency manager 300 recognizes the occurrence of an event through signaling or a message from another frequency manager 300. The signaling/message is reported via the wired or wireless interface described above with reference to FIGS. 5 to 13. Specific content of the signaling/message will be described below.

(Common Information: Common Info)

The signaling/message may include the following information as information common to the events:

an event type; and information related to a target base station 100.

Here, the event type is identification information identifying the events 1 to 9. The information related to the target base station 100 is, for example, information including cell ID, a cell type, mobility, position information, and information indicating indoor/outdoor.

Next, information specific to each event will be described. The signaling/message may include the following information for each event.

(Event 1)

A Frequency maintenance time arrival notification

This information is information indicating whether or not a frequency maintenance time has arrived. For example, a notification of this information is given from the frequency manager 300 to the base station 100. For example, the frequency manager 300 is provided with a dedicated timer for a frequency maintenance time and gives a notification indicating whether the timer expires.

(Events 2, 3A-1, 3A-2, 3C-1, and 3C-2)

A sleep mode transition notification

An identifier of a base station transitioning to the sleep mode

An active mode return notification

An identifier of a base station returning to the active mode

The sleep mode transition notification is information indicating transition to the sleep mode. The identifier of the base station transitioning to the sleep mode is identification information identifying the base station 100 which transitions to the sleep mode. The active mode return notification is information indicating return from the sleep mode. The identifier of the base station returning to the active mode is identification information identifying the base station 100 returning from the sleep mode. The present signaling/message can be used in the scenarios 3, 1+2a/2b, and 3'.

(Event 4)

A handover execution notification

A handover target UE identifier

The number of active UEs in a cell after handover execution

The number of active UEs in a handover destination cell

The handover execution notification is information indicating that the handover is performed. The handover target UE identifier is identification information identifying a UE which is to perform the handover. The number of active UEs in the cell after the handover execution is information indicating the number of active UEs after the handover execution in the cell before the handover. The number of active UEs in the handover destination cell is information indicating the number of active UEs in the handover destination cell. The present signaling/message can be used in the scenarios 3, 1+2a/2b, and 3'.

(Event 5)

A carrier aggregation execution notification

Information related to an activated/deactivated CC

The carrier aggregation execution notification is information indicating that the carrier aggregation is performed. The information related to the activate/deactivated CC is information indicating a frequency, a bandwidth, and the like of an activated/deactivated CC. The present signaling/message can be used in the scenarios 3, 1+2a/2b, and 3'.

(Event 6)

A base station mode switching process execution notification

Information related to a terminal device serving as a mobile base station

The base station mode switching process execution notification is information indicating that the user terminal 200 performs a process of switching to the base station mode. The information related to the user terminal 200 serving as the mobile base station is information indicating a position and a device class of the user terminal 200 which switches to the base station mode and serves as the mobile base station. The present signaling/message can be used in the scenario 1+2a/2b.

(Event 7)

A measurement report for inter-frequency measurement

The present signaling/message can be used in the scenarios 3, 1+2a/2b, and 3'.

(Event 8)

A protection request from a high priority system

An alert from a low priority system

The protection request from the high priority system is information indicating that a high priority wireless communication system should be protected. For example, a high priority wireless communication system can detect an interference level by itself and notify the frequency manager 300 of this information. The alert from the low priority system is information indicating that protection of the high priority wireless communication system is not sufficient. For example, a low priority wireless communication system can determine that it is difficult to protect a high priority wireless communication system and notify the frequency manager 300 of this information. The present signaling/message can be used in the scenarios 3, 1+2a/2b, and 3'.

(Event 9)

Coverage hole area information

Information on a base station near a coverage hole

The coverage hole area information is information indicating a position, a size, and the like of the coverage hole. The base station information around the coverage hole is information related to the base station 100 located near the coverage hole. The present signaling/message can be used in the scenarios 3, 1+2a/2b, and 3'.

The signaling/message has been described above. An exemplary configuration of the components of the wireless communication system 1 will be described below.

[2-4. Exemplary Configuration of Base Station]

Figure 14:
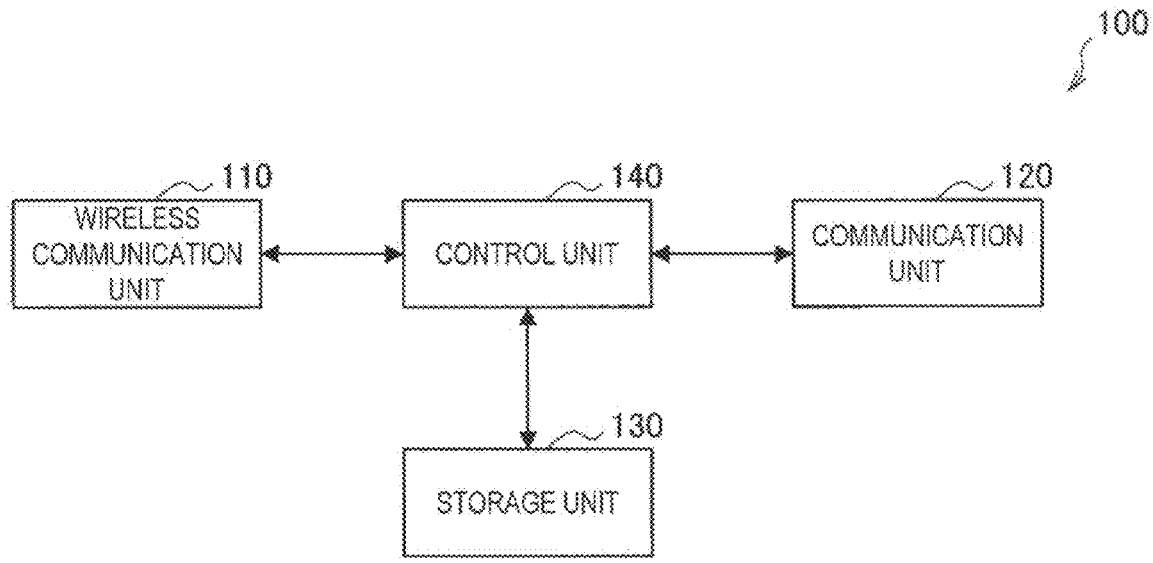
FIG. 14 is a block diagram illustrating an example of a logical configuration of a base station according to the present embodiment.

FIG. 14 is a block diagram illustrating an example of a logical configuration of the base station 100 according to the present embodiment. As illustrated in FIG. 14, the base station 100 includes a wireless communication unit 110, a communication unit 120, a storage unit 130, and a control unit 140.

(1) Wireless Communication Unit 110

The wireless communication unit 110 is a wireless communication module that performs transmission and reception of data with other wireless communication devices. The wireless communication unit 110 according to the present embodiment has a function of performing wireless communication with the user terminal 200 using one or more frequencies. The wireless communication unit 110 performs wireless communication with other wireless communication devices directly or via a network access point or the like according to a scheme such as LTE, LTE-A, a wireless LAN, wireless fidelity (Wi-Fi) (registered trademark), infrared communication, or Bluetooth (registered trademark).

(2) Communication Unit 120

The communication unit 120 is a communication module that performs transmission and reception of data with other information processing devices in a wired/wireless manner. The communication unit 120 according to the present embodiment has a function of performing communication with the frequency manager 300. The communication unit 120 may transmit information indicating a communication environment in the base station 100 to the frequency manager 300. For example, the communication unit 120 transmits measurement information indicating a measurement result in the base station 100 in response to a measurement information request received from the frequency manager 300. Further, the communication unit 120 may transmit information indicating a communication environment in the user terminal 200 to the frequency manager. For example, the communication unit 120 transmits a measurement report from the user terminal 200 which is connected to and managed by the base station 100 in response to a measurement information request received from the frequency manager 300.

(3) Storage Unit 130

The storage unit 130 is a part that performs recording and reproducing of data on a predetermined recording medium. For example, the storage unit 130 may store information indicating a frequency which is set to be used by the frequency manager 300. Further, the storage unit 130 may store information indicating the communication environment in the base station 100 or the user terminal 200 managed by the base station 100. Further, the storage unit 130 may store parameters related to measurement to be described later.

(4) Control Unit 140

The control unit 140 functions as an operation processing unit and a control unit, and controls overall operation of the base station 100 according to various kinds of programs. The control unit 140 according to the present embodiment has a function of controlling the wireless communication unit 110 such that the frequency set by the frequency manager 300 via the communication unit 120 is used using the occurrence of an event as a trigger.

Further, the control unit 140 has a function of controlling an acquisition process of acquiring information indicating the communication environment. For example, the control unit 140 controls the base station 100 such that the measurement is performed or collects the measurement report from the user terminal 200 which is connected to and managed by the base station 100. In response to the measurement information request from the frequency manager 300, the control unit 140 may transmit information indicating the communication environment stored in the storage unit 130 or information indicating a newly collected communication environment to the frequency manager 300.

For example, when the base station 100 performs the measurement, the control unit 140 performs the measurement according to the following parameters:

a center frequency of target band;

a type, a device class, and the like of a wireless system using a target band; and a measurement bandwidth.

The parameters may be stored in the storage unit 130, may be included in the measurement information request, or may be reported through other signaling/messages.

When the measurement report is collected from the user terminal 200, the control unit 140 controls the wireless communication unit 110 such that the measurement information request is relayed, for example, from the frequency manager 300 to the user terminal 200.

Further, the control unit 140 has a function of notifying the frequency manager 300 of the occurrence of an event. For example, the control unit 140 monitors the occurrence of an event set by the frequency manager 300. Then, when the event occurs, the control unit 140 notifies the frequency manager 300 of the occurrence of the event using the above signaling/message.

[2-5. Exemplary Configuration of User Terminal]

Figure 15:
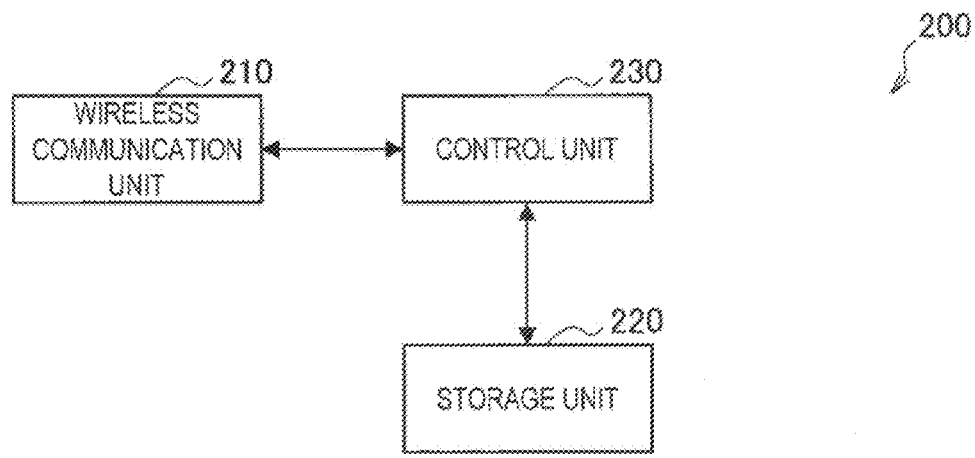
FIG. 15 is a block diagram illustrating an example of a logical configuration of a user terminal according to the present embodiment.

FIG. 15 is a block diagram illustrating an example of the logical configuration of the user terminal 200 according to the present embodiment. As illustrated in FIG. 15, the user terminal 200 includes a wireless communication unit 210, a storage unit 220, and a control unit 230.

(1) Wireless Communication Unit 210

The wireless communication unit 210 is a wireless communication module that performs transmission and reception of data with other wireless communication devices. The wireless communication unit 210 according to the present embodiment has a function of communicating with the base station 100 of the wireless communication system 1 in which one or more frequencies are used. The wireless communication unit 210 performs wireless communication with the base station 100 directly or via a network access point or the like according to a scheme such as LTE, LTE-A, wireless LAN, Wi-Fi, infrared communication, or Bluetooth.

(2) Storage Unit 220

The storage unit 220 is a part that performs recording and reproducing of data on a predetermined recording medium. For example, the storage unit 220 may store parameters related to measurement to be described later.

(3) Control Unit 230

The control unit 230 functions as an operation processing unit and a control unit, and controls overall operation of the user terminal 200 according to various kinds of programs. The control unit 230 has a function of performing control such that information used for setting the frequency used by the base station 100 of the wireless communication system 1 is transmitted to the frequency manager 300 via the wireless communication unit 210 using the occurrence of an event set by the frequency manager 300 as a trigger. For example, the control unit 230 collects information indicating the communication environment based on the control from the base station 100, and transmits the information to the frequency manager 300 via the base station 100.

Specifically, the control unit 230 transmits the measurement report to the frequency manager 300 in response to the measurement information request received from the frequency manager 300 via the base station 100. For example, the measurement report may include information related to a serving cell or a neighbor cell. Further, the measurement report may include reference signal received power (RSRP), signal to interference and noise ratio (SINR), channel quality indicator (CQI), reference signal received quality (RSRQ), or the like.

For example, the control unit 230 performs the measurement according to the following parameters:

a center frequency of a target band;
a type, a device class, and the like of a wireless system using a target band;
a measurement bandwidth; and
a measurement gap configuration.

The parameters may be stored in the storage unit 220, may be included in the measurement information request, or may be reported through other signaling/messages.

Further, the control unit 230 has a function of controlling a process according to a change when the frequency used in the base station 100 with which the wireless communication unit 210 communicates is changed. For example, the control unit 230 may control the wireless communication unit 210 such that handover to a cell operated according to a changed frequency is performed. Further, the control unit 230 may control the wireless communication unit 210 such that handover to a cell operated by another base station 100 is performed.

Further, the control unit 230 may control a process of switching the user terminal 200 to the base station mode. For example, the control unit 230 may perform switching to the base station mode based on a user instruction or under control by the base station 100.

[2-6. Exemplary Configuration of Frequency Manager]

Figure 16:
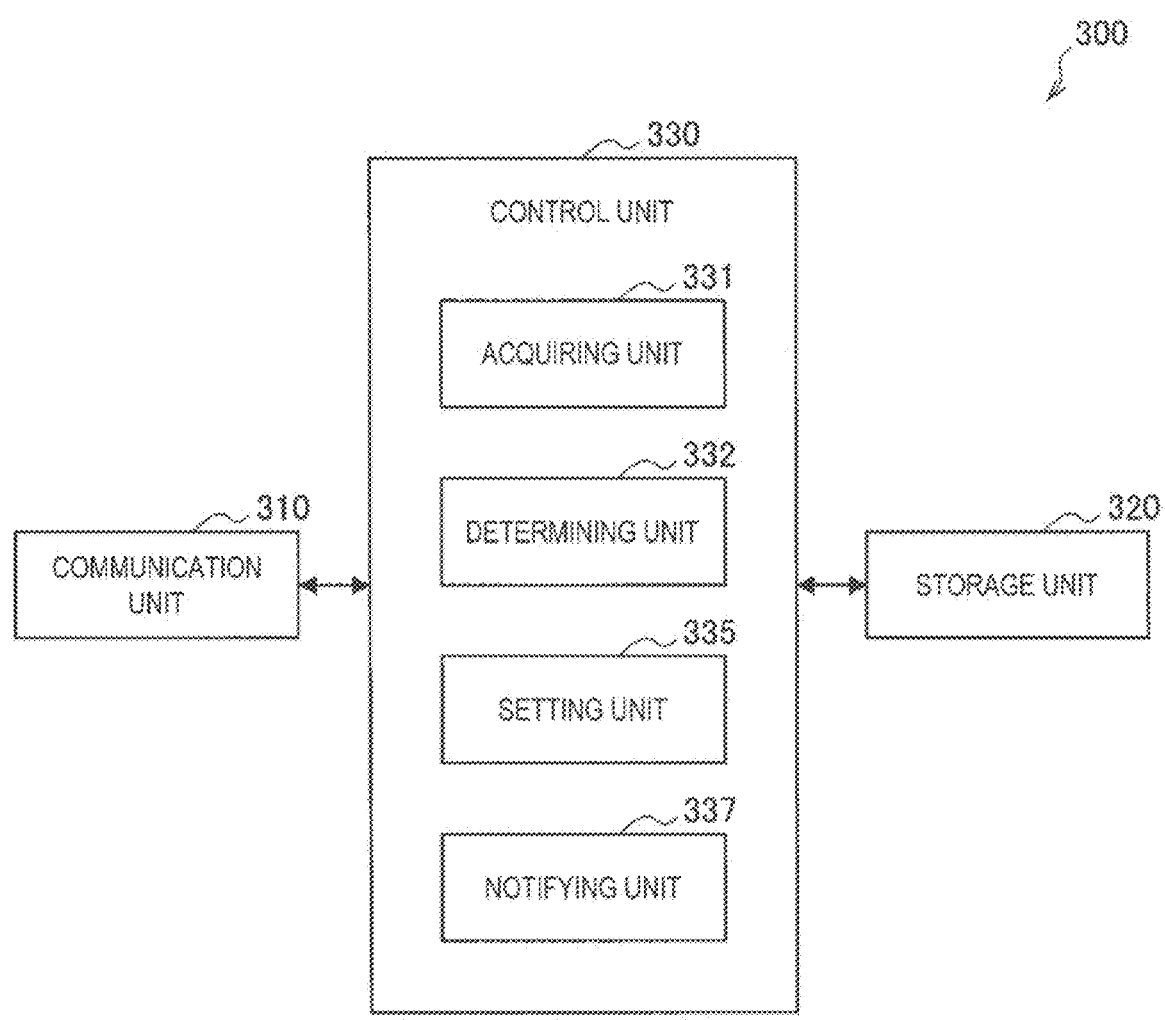
FIG. 16 is a block diagram illustrating an example of a logical configuration of a frequency manager according to the present embodiment.

FIG. 16 is a block diagram illustrating an example of a logical configuration of the frequency manager 300 according to the present embodiment. As illustrated in FIG. 16, the frequency manager 300 includes a communication unit 310, a storage unit 320, and a control unit 330.

(1) Communication Unit 310

The communication unit 310 is a communication module that performs transmission and reception of data with other information processing devices in a wire/wireless manner. The communication unit 310 according to the present embodiment has a function of communicating with the base station 100 of the wireless communication system 1 in which one or more frequencies are used. For example, the communication unit 310 transmits a control message including information indicating a frequency which is set by the setting unit 335 (which will be described later) and used to the base station 100. Hereinafter, this control message is also referred to as a "frequency setting notification." The communication unit 310 may communicate with the user terminal 200 which is managed by the base station 100, another frequency manager 300, or other wireless communication systems 1 in addition to the base station 100.

(2) Storage Unit 320

The storage unit 320 is a part that performs recording and reproducing of data on a predetermined recording medium. For example, the storage unit 320 stores various kinds of information acquired by an acquiring unit 331 (which will be described later).

(3) Control Unit 330

The control unit 330 functions as an operation processing unit and a control unit, and controls overall operation of the frequency manager 300 according to various kinds of programs. The control unit 330 according to the present embodiment performs various kinds of processes for flexibly adjusting the frequency resources used by the base station 100. As illustrated in FIG. 16, the control unit 330 functions as the acquiring unit 331, a determining unit 333, the setting unit 335, and a notifying unit 337.

(3-1) Acquiring Unit 331

The acquiring unit 331 has a function of acquiring information for a setting by the setting unit 335 to be described later. The acquiring unit 331 acquires information for a setting by the setting unit 335 from the base station 100, the user terminal 200, another frequency manager 300, or other wireless communication systems 1 through the communication unit 310.

For example, the acquiring unit 331 acquires a message indicating the occurrence of an event as the information for the setting by the setting unit 335.

For example, the acquiring unit 331 receives information indicating the communication environment in a device belonging to the wireless communication system 1 as the information for the setting by the setting unit 335. The information indicating the communication environment may be measurement information indicating the measurement result from the base station 100 belonging to the wireless communication system 1. For example, the acquiring unit 331 notifies the target base station 100 of the measurement information request and acquires the measurement information. In addition, the information indicating the communication environment may be a measurement report illustrating the measurement result from the user terminal 200 belonging to the wireless communication system 1. For example, the acquiring unit 331 notifies the target user terminal 200 of the measurement information request directly or indirectly via the base station 100 and acquires the measurement report. The acquiring unit 331 may transmit the measurement information request using acquisition of the message indicating the occurrence of an event as a trigger.

In addition, the information indicating the communication environment may be information related to throughput. The information related to the throughput may include information indicating user throughput, cell throughput, or cluster throughput (in-cluster throughput). The information related to the throughput may include a buffer status report (BSR), the user throughput itself, or information indicating a time taken for data reception. When the base station 100 or the network side is able to estimate the throughput based on a transport block (TB) size, the number of retransmissions of automatic repeat-request (ARQ)/hybrid ARQ (HARQ), or the like, the frequency manager 300 may secondarily use the information related to the throughput.

(3-2) Determining Unit 333

The determining unit 333 has a function of determining whether or not the frequency used by the base station 100 is changed. For example, the determining unit 333 determines whether or not it is necessary to change the frequency using the information indicating the communication environment in the wireless communication system 1. When it is determined to be necessary to change the frequency, the determining unit 333 determines a frequency to be allocated to the base station 100 whose frequency resources are adjusted using the information indicating the communication environment. The determining unit 333 may determine a frequency to be allocated to the base station 100 whose frequency resources are adjusted using the information indicating the communication environment, determine that the frequency is changed when the frequency is different from the frequency being used, and determine that the frequency is not changed when the frequencies are the same. The determining unit 333 may perform the determination using information indicating influence of inter-cell interference among the information indicating the communication environment in the wireless communication system 1. As a result, the frequency manager 300 can control the frequency resources according to the influence of the inter-cell interference, and thus the coverage and the capacity can be improved.

An example of an algorithm related to the determination process by the determining unit 333 will be described below.

Algorithm Example 1

The present algorithm example is an example in which the determining unit 333 determines whether or not it is necessary to change the frequency based on the RSRP which is the information indicating the communication environment. For example, the determining unit 333 compares an RSRP [dBm] of a target small cell with an RSRP [dBm] of a neighbor cell using the following Formula 1 and determines whether or not it is necessary to change the frequency.

[Math. 1]

$$RSRP_{Small(dBm)} - RSRP_{neighbor(dBm)} > \gamma_{(dB)}$$   Formula 1

$RSRP_{Small(dBm)}$ is an RSRP related to the target small cell. $RSRP_{neighbor(dBm)}$ is an RSRP related to the neighbor cell and corresponds to the information indicating the influence of the inter-cell interference. The RSRPs can be measured, for example, by the base station 100 of the target small cell or the user terminal 200 connected to the target small cell. $\gamma$ is an arbitrary threshold value.

For example, the determining unit 333 allocates the same frequency (F1) as that of the neighbor cell to the base station 100 of the target small cell when Formula 1 is true. On the other hand, the determining unit 333 allocates the frequency (F2) different from that of the neighbor cell to the base station 100 of the target small cell when Formula 1 is not true.

Further, when the neighbor cell is a macro cell, the determining unit 333 can determine whether or not it is necessary to change the frequency using the following Formula 2.

[Math. 2]

$$RSRP_{Small(dBm)} - RSRP_{Macro(dBm)} > \gamma_{(dB)}$$   Formula 2

$RSRP_{Macro(dBm)}$ is an RSRP related to a macro cell and corresponds to the information indicating the influence of the inter-cell interference For example, the determining unit 333 allocates the same frequency (F1) as that of the macro cell to the base station 100 of the target small cell when Formula 2 is true. On the other hand, the determining unit 333 allocates a frequency (F2) different from that of the macro cell to the base station 100 of the target small cell when Formula 2 is not true.

Further, when interference from another macro cell is considered, the determining unit 333 may use the following Formula 3.

[Math. 3]

$$RSRP_{Small(dBm)} - 10\log\left(\sum 10^{\frac{RSRP_{Macro(dBm)}}{10}}\right)_{(dBm)} > \gamma_{(dB)}$$   Formula 3

Further, when interference from a neighbor small cell already using the same frequency as the macro cell is considered, the determining unit 333 may use the following Formula 4.

[Math. 4]

$$RSRP_{Small(dBm)} - 10\log\left(\sum 10^{\frac{RSRP_{Macro(dBm)}}{10}} + \sum 10^{\frac{RSRP_{OtherSmall(dBm)}}{10}}\right)_{(dBm)} > \gamma_{(dB)}$$   Formula 4

$RSRP_{OtherSmall(dBm)}$ is an RSRP related to a neighbor small cell and corresponds to the information indicating the influence of the inter-cell interference. For example, the determining unit 333 may estimate the RSRP related to the neighbor small cell in the user terminal 200 at the cell edge using the measurement information in the base station 100.

Further, the determining unit 333 may replace RSRP$_{Macro(dBm)}$ of Formulas 2 to 4 with reception power from the high priority wireless communication system 1 and replace RSRP$_{Small(dBm)}$ with reception power from the cell of its own system. Further, in the present algorithm, the determining unit 333 may add a value such as a hysteresis margin to the RSRP. In this case, the determining unit 333 can divert an existing measurement report. The determining unit 333 can use the present algorithm in the scenarios 3, 1+2a/2b, and 3'.

Algorithm Example 2

The present algorithm example is an example in which the determining unit 333 determines whether or not it is necessary to change the frequency based on the RSRQ which is the information indicating the communication environment. For example, the determining unit 333 compares an RSRQ [dBm] of a target small cell for each frequency using the following Formula 5 and determines whether or not it is necessary to change the frequency change.

[Math. 5]

$$RSRQ_{Small,F1(dBm)} - RSRQ_{Small,F2(dBm)} > \gamma_{(dB)} \quad \text{Formula 5}$$

RSRQ$_{Small,F1(dBm)}$ is an RSRQ related to the frequency F1. Further, RSRQ$_{Small,F2(dBm)}$ is an RSRQ related to the frequency F2. The RSRQs can be measured, for example, by the base station 100 of the target small cell or the user terminal 200 connected to the target small cell.

For example, the determining unit 333 allocates the frequency (F1) to the base station 100 of the target small cell when Formula 5 is true. On the other hand, the determining unit 333 allocates the frequency (F2) to the base station 100 of the target small cell when Formula 5 is not true. In the present algorithm, the determining unit 333 may add a value such as a hysteresis margin to the RSRQ. In this case, the determining unit 333 can divert an existing measurement report. The determining unit 333 can use the present algorithm in the scenarios 3, 1+2a/2b, and 3'.

Algorithm Example 3

The present algorithm example is an example in which the determining unit 333 determines whether or not it is necessary to change the frequency based on a metric related to a reception SINR or CQI that is the information indicating the communication environment. Normally, the CQI is a maximum value at which a block error rate (BLER) reaches 10% and can be acquired by comparing the SINR and the BLER table.

FIGS. 17 and 18 are explanatory diagrams for describing the change of the used frequency in the base station 100 according to the present embodiment. In the example illustrated in FIGS. 17 and 18, the macro cell base stations 100A and 100B use the frequency F1, and the small cell base station 100D uses the frequency F2. The user terminal 200 uses the small cell operated by the small cell base station 100C as the serving cell, the small cell base station 100C uses the frequency F2 in the example illustrated in FIG. 17 and uses the frequency F1 in the example illustrated in FIG. 18. Here, the SINRs related to the frequencies F1 and F2 in user terminal 200 are assumed to be an SINR$_{F1}$ and an SINR$_{F2}$, respectively. Further, the CQIs are assumed to be CQI$_{F1}$, CQI$_{F2}$, respectively. At this time, it is easily assumed that SINR$_{F1}$≠SINR$_{F2}$ and CQI$_{F1}$≠CQI$_{F2}$.

In the example illustrated in FIG. 17, the user terminal 200 receives no interference or negligible interference from the macro cell having the frequency different from that of the serving cell, and receives interference from the small cell having the same frequency as the serving cell. If a signal component from the serving cell is indicated by S$_{F2}$, an interference component from another small cell is indicated by I$_{F2}$, and a noise component is indicated by N$_{F2}$, SINR$_{F2}$ is SF2/(I$_{F2}$+N$_{F2}$). The interference component I$_{F2}$ corresponds to the information indicating the influence of the inter-cell interference.

In the example illustrated in FIG. 18, the user terminal 200 receives interference from the macro cell having the same frequency as the serving cell but receives no interference or negligible interference from another small cell having a different frequency from the serving cell. If a signal component from the serving cell is indicated by S$_{F1}$, an interference component from the macro cell is indicated by I$_{F1}$, and a noise component is indicated by N$_{F1}$, SINR$_{F1}$ is S$_{F1}$/(I$_{F1}$+N$_{F1}$). The interference component I$_{F1}$ corresponds to the information indicating the influence of the inter-cell interference.

A case in which the target small cell transitions from a state in which the frequency F2 is used as illustrated in FIG. 17 to a state in which the frequency F1 is used as illustrated in FIG. 18 will be described below as an example.

Normally, the user terminal 200 receives an instruction to perform the inter-frequency measurement from a network side for measurement of a cell having a different frequency. The cell having a different frequency is, for example, the macro cell in the example illustrated in FIG. 17, that is, the small cell different from the serving cell when the base station 100C operating the serving cell can simultaneously operate a plurality of frequencies (CCs). According to the inter-frequency measurement instruction, the user terminal 200 is considered to be able to estimate the SINR or the CQI in the state after the frequency is changed as illustrated in FIG. 18 or a metric SINR' or CQI' corresponding thereto even in the state before the frequency is changed as illustrated in FIG. 17. The SINR' may be an RSRQ.

In this regard, the determining unit 333 allocates the frequency F1 to the serving cell, for example, when a CQI'$_{F1}$ is larger than a CQI'$_{F2}$, and continuously allocates the frequency F2 to the serving cell when the CQI'$_{F1}$ is not larger than the CQI'$_{F2}$. The same applies when the target small cell transitions from the state in which the frequency F1 is used to the state in which the frequency F2 is used.

According to the present algorithm, the frequency manager 300 estimates the changed metric before the serving cell changes the frequency, and adjusts the frequency resources using the estimated metric. For this reason, the present algorithm does not need measurement after the frequency is changed, and thus it is possible to reduce a time taken to adjust the frequency resources.

For example, the metrics such as SINR, CQI, SINR', and CQI' are acquired by the base station 100, the cluster head, the frequency manager 300, or the user terminal 200. For example, the determining unit 333 may selectively use a worst value acquired in the cell from the acquired metrics or may use an average value. Further, when collaboration is performed between the frequency managers 300, the determining unit 333 may use a metric having the worst value among the metrics acquired by the respective frequency managers 300. Further, for example, when there is a user terminal 200 or a cell to be protected, the determining unit 333 may use the worst value of the metric acquired by the user terminal 200 or the cell. Further, the determining unit 333 may add an offset value according to a position (indoors/outdoors) for each metric.

The present algorithm may be used when the event 7 occurs. The determining unit 333 can use the present algorithm in the scenarios 3, 1+2a/2b, and 3'.

Algorithm Example 4

The present algorithm example is an example in which the determining unit 333 determines whether or not it is necessary to change the frequency based on the throughput which is the information indicating the communication environment. For example, the determining unit 333 determines whether or not it is necessary to change the frequency of each cell to achieve throughput fairness between cells or in a cluster area. Specifically, the determining unit 333 may determine whether or not it is necessary to change the frequency of each cell by applying a concept of proportional fairness user scheduling and calculating a metric of proportional fairness based on cell throughput. Further, for example, when there is an area in which low throughput is concentrated, the determining unit 333 may determine to change a frequency of a cell near the area. As a result, the frequency manager 300 can close the coverage hole. The determining unit 333 can use this algorithm in the scenarios 3, 1+2a/2b, and 3'.

(3-3) Setting Unit 335

The setting unit 335 has a function of setting the event and setting the frequency used by the base station 100 using the occurrence of a set event as a trigger. The setting unit 335 transmits a frequency setting notification for setting the frequency allocated to each base station 100 by the determining unit 333 to each base station 100 via the communication unit 310. The frequency setting notification may include, for example, information indicating a CC to be used by the base station 100. Target whose frequency is set by the setting unit 335 are considered to be various. For example, the setting unit 335 may set the frequency used by the macro cell base station, the small cell base station, a plurality of clustered base stations, or the user terminal 200 operating as the mobile base station. As a result, the setting unit 335 can cause each base station 100 to use the set frequency. In addition, the setting unit 335 may cause the base station 100 that carries out the carrier aggregation to activate a designated CC.

(3-5) Notifying Unit 337

The notifying unit 337 has a function of notifying the user terminal 200 communicating with the base station 100 of information indicating that the frequency used by the base station 100 is changed. For example, the notifying unit 337 may give a notification using a physical broadcast channel (PBCH), a physical uplink control channel (PUCCH), a physical downlink shared channel (PDSCH), or a dedicated signal.

There may be a user terminal 200 (serving terminal) whose serving cell is a cell operated by the base station 100 whose frequency is changed. In this case, the serving terminal is notified of the information indicating that the frequency used by the base station 100 is changed and can perform handover to another cell or handover to a cell operated by the changed frequency.

In addition, the notifying unit 337 may give a notification to the serving terminal to simply perform handover without explicitly notifying of the information indicating that the frequency used by the base station 100 is changed. In this case, the notifying unit 337 may notify the serving terminal that the control signal and the reference signal are transmitted at the changed frequency and cause the serving terminal to perform measurement in order to reconfigure an RRC connection. In this case, the notifying unit 337 may notify of a center frequency, a bandwidth, types of the control signal and the reference signal, and information on timing synchronization after the change.

The notifying unit 337 can give the present notification in the scenarios 3, 1+2a/2b, and 3'.

3. OPERATION PROCESSES

Hereinafter, operation process examples of the wireless communication system 1 according to the present embodiment will be described with reference to FIGS. 19 to 29.

[3-1. Measurement Information Acquisition Process]

Operation process examples in which the frequency manager 300 acquires the measurement information will be described with reference to FIGS. 19 to 26.

Process Example 1

FIG. 19 is a sequence diagram illustrating an example of a flow of a measurement information acquisition process performed in the wireless communication system 1 according to the present embodiment. As illustrated in FIG. 19, the base station 100 and the frequency manager 300 are involved in the present sequence.

First, in step S102, the frequency manager 300 transmits the measurement information request to the base station 100.

Then, in step S104, the base station 100 performs the measurement.

Then, in step S106, the base station 100 transmits the measurement information indicating the measurement result to the frequency manager 300.

The present sequence can be performed in the scenarios 3, 1+2a/2b, and 3'.

Process Example 2

FIG. 20 is a sequence diagram illustrating an example of a flow of a measurement information acquisition process performed in the wireless communication system 1 according to the present embodiment. As illustrated in FIG. 20, the small cell base station 100A in the cluster, the small cell base station 100B of the cluster head, and the frequency manager 300 are involved in the present sequence.

First, in step S202, the frequency manager 300 transmits the measurement information request to the small cell base station 100B of the cluster head.

Then, in step S204, the small cell base station 100B of the cluster head transmits the measurement information request received in step S202 to the small cell base station 100A in the cluster.

Then, in step S206, the base station 100A in the cluster performs the measurement.

Then, in step S208, the base station 100A in the cluster transmits the measurement information indicating the measurement result to the small cell base station 100B of the cluster head.

Then, in step S210, the small cell base station 100B of the cluster head transmits the measurement information received in step S208 to the frequency manager 300.

The present sequence can be performed in the scenarios 3, 1+2a/2b, and 3'.

Process Example 3

FIG. 21 is a sequence diagram illustrating an example of a flow of a measurement information acquisition process performed in the wireless communication system 1 according to the present embodiment. As illustrated in FIG. 21, the mobile base station 100A, the macro cell base station 100B, and the frequency manager 300 are involved in the present sequence.

First, in step S302, the frequency manager 300 transmits the measurement information request to the macro cell base station 100B.

Then, in step S304, the macro cell base station 100B transmits the measurement information request received in step S302 to the mobile base station 100A.

Then, in step S306, the mobile base station 100A performs the measurement.

Then, in step S308, the mobile base station 100A transmits the measurement information indicating the measurement result to the macro cell base station 100B.

Then, in step S310, the macro cell base station 100B transmits the measurement information received in step S308 to the frequency manager 300.

The present sequence can be performed in the scenario 1+2a/2b.

Process Example 4

FIG. 22 is a sequence diagram illustrating an example of a flow of a measurement information acquisition process performed in the wireless communication system 1 according to the present embodiment. As illustrated in FIG. 22, the user terminal 200, the small cell base station 100, and the frequency manager 300 are involved in the present sequence.

First, in step S402, the user terminal 200 periodically performs the measurement and transmits the measurement report to the small cell base station 100 operating the serving cell.

Then, in step S404, the frequency manager 300 recognizes the occurrence of an event. For example, the frequency manager 300 recognizes the occurrence of an event by receiving a message indicating that an event has occurred from the base station 100, the user terminal 200, another frequency manager 300, or the like.

Then, in step S406, the frequency manager 300 transmits the measurement information request to the small cell base station 100.

Then, in step S408, the small cell base station 100 transmits the measurement report periodically collected in step S402 to the frequency manager 300.

The present sequence can be performed in the scenarios 3, 1+2a/2b, and 3'.

Process Example 5

FIG. 23 is a sequence diagram illustrating an example of a flow of a measurement information acquisition process performed in the wireless communication system 1 according to the present embodiment. As illustrated in FIG. 23, the user terminal 200, the small cell base station 100, and the frequency manager 300 are involved in the present sequence.

First, in step S502, the frequency manager 300 recognizes the occurrence of an event.

Then, in step S504, the frequency manager 300 transmits the measurement information request to the small cell base station 100.

Then, in step S506, the small cell base station 100 transmits the measurement information request received in step S504 to the user terminal 200 serving as the serving terminal.

Then, in step S508, the user terminal 200 performs the measurement.

Then, in step S510, the user terminal 200 transmits the measurement report to the small cell base station 100.

Then, in step S512, the small cell base station 100 transmits the measurement report received in step S510 to the frequency manager 300.

The present sequence can be performed in the scenarios 3, 1+2a/2b, and 3'.

Process Example 6

FIG. 24 is a sequence diagram illustrating an example of a flow of a measurement information acquisition process performed in the wireless communication system 1 according to the present embodiment. As illustrated in FIG. 24, the user terminal 200, the small cell base stations 100 A to 100B in the cluster, the small cell base station 100C of the cluster head, and the frequency manager 300 are involved in the present sequence.

First, in step S602, the frequency manager 300 recognizes the occurrence of an event.

Then, in step S604, the frequency manager 300 transmits the measurement information request to the small cell base station 100C of the cluster head.

Then, in step S606, the small cell base station 100C of the cluster head selects the small cell base station 100 to which the measurement information request is transmitted among the small cell base stations 100 in the cluster.

Then, in step S608, the small cell base station 100C of the cluster head transmits the measurement information request to the small cell base station 100 in the cluster selected in step S606.

Then, in step S610, the small cell base station selected in step S606 transmits the measurement information request received in step S608 to the user terminal 200 serving as the serving terminal.

Then, in step S612, the user terminal 200 that has received the measurement information request performs the measurement.

Then, in step S614, feedback of the measurement report is performed. Specifically, the user terminal 200 that has performed the measurement in step S612 transmits the measurement report to the small cell base station 100C of the cluster head via the small cell base station 100.

Then, in step S616, the small cell base station 100C of the cluster head selects the measurement report fed back in step S614. For example, the small cell base station 100C of the cluster head does not select a measurement report related to a cell whose frequency resources need not be adjusted.

Then, in step S618, the small cell base station 100C of the cluster head transmits the measurement report selected in step S616 to the frequency manager 300.

The present sequence can be performed in the scenarios 3, 1+2a/2b, and 3'.

Process Example 7

Figure 25:
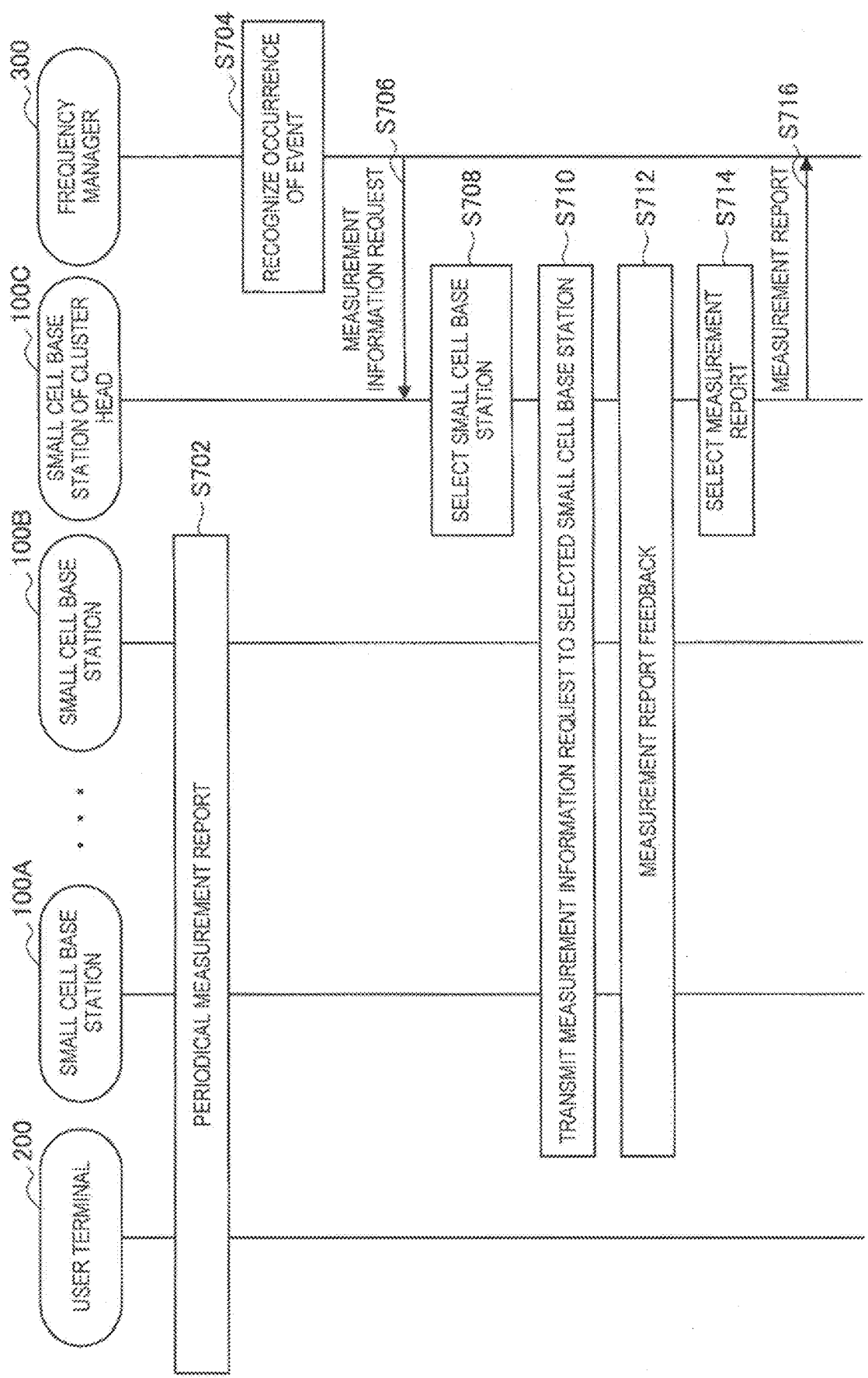
FIG. 25 is a sequence diagram illustrating an example of a flow of a measurement information acquisition process performed in the wireless communication system according to the present embodiment.

FIG. 25 is a sequence diagram illustrating an example of a flow of a measurement information acquisition process performed in the wireless communication system 1 according to the present embodiment. As illustrated in FIG. 25, the user terminal 200, the small cell base stations 100 A to 100B in the cluster, the small cell base station 100C of the cluster head, and the frequency manager 300 are involved in the present sequence.

First, in step S702, the user terminal 200 periodically performs the measurement and transmits the measurement report to the small cell base station 100.

Then, in step S704, the frequency manager 300 recognizes the occurrence of an event.

Then, in step S706, the frequency manager 300 transmits the measurement information request to the small cell base station 100C of the cluster head.

Then, in step S708, the small cell base station 100C of the cluster head selects the small cell base station 100 that transmits the measurement information request among the small cell base stations 100 in the cluster.

Then, in step S710, the small cell base station 100C of the cluster head transmits the measurement information request to the small cell base station 100 in the cluster selected in step S708.

Then, in step S712, feedback of the measurement report is performed. Specifically, the small cell base station 100 that has received the measurement information request in step S710 transmits the measurement report periodically collected in step S702 to the small cell base station 100C of the cluster head.

Then, in step S714, the small cell base station 100C of the cluster head selects the measurement report fed back in step S712.

Then, in step S716, the small cell base station 100C of cluster head transmits the measurement report selected in step S714 to the frequency manager 300.

The present sequence can be performed in the scenarios 3, 1+2a/2b, and 3'.

Process Example 8

Figure 26:
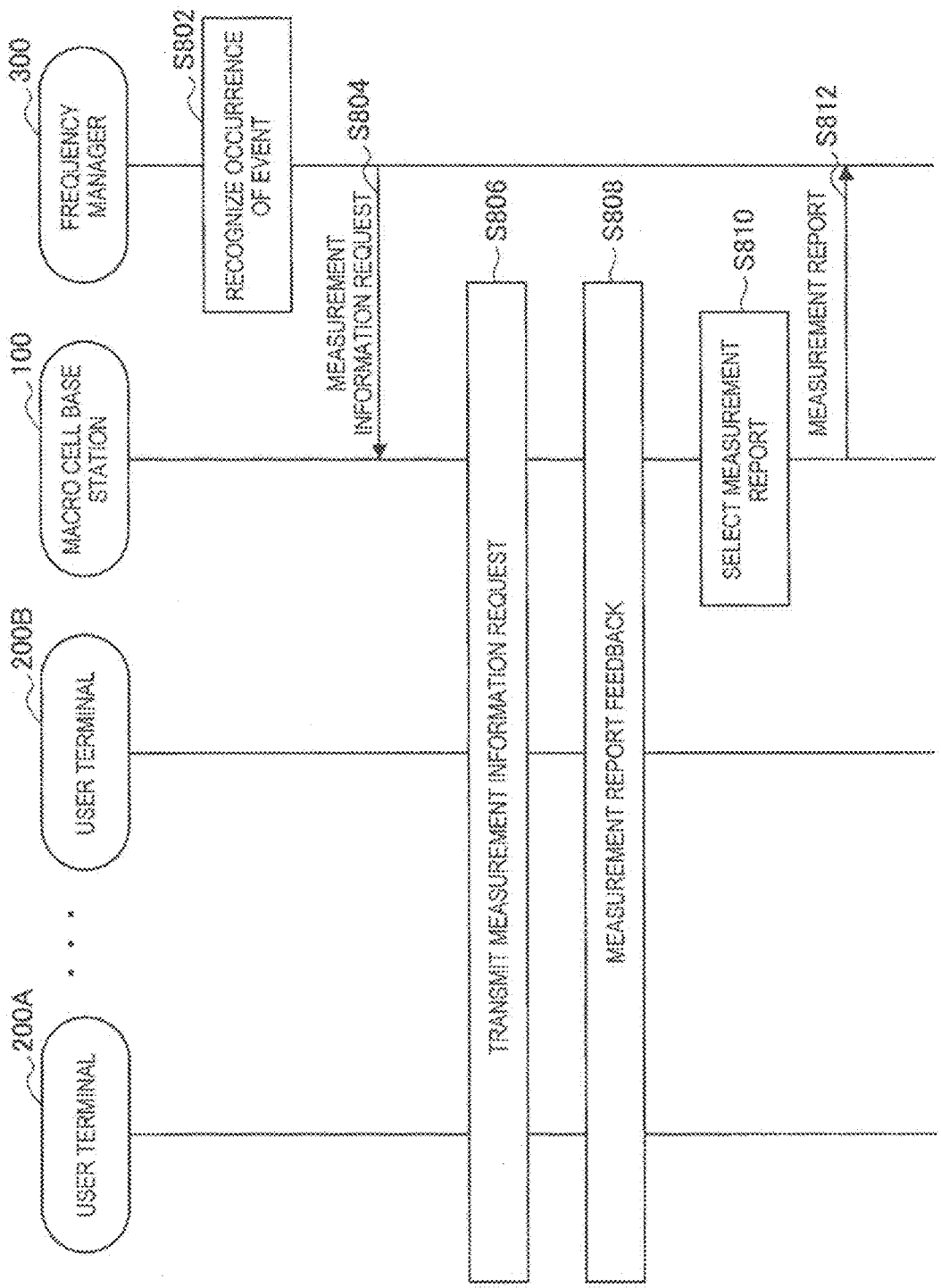
FIG. 26 is a sequence diagram illustrating an example of a flow of a measurement information acquisition process performed in the wireless communication system according to the present embodiment.

FIG. 26 is a sequence diagram illustrating an example of a flow of a measurement information acquisition process performed in the wireless communication system 1 according to the present embodiment. As illustrated in FIG. 26, the user terminals 200A to 200B, the macro cell base station 100, and the frequency manager 300 are involved in the present sequence.

First, in step S802, the frequency manager 300 recognizes the occurrence of an event.

Then, in step S804, the frequency manager 300 transmits the measurement information request to the macro cell base station 100.

Then, in step S806, the macro cell base station 100 transmits the measurement information request received in step S804 to the user terminals 200A to 200B serving as the serving terminal.

Then, feedback of the measurement report is performed in step S808. Specifically, the user terminals 200A to 200B that have received the measurement information request in step S806 perform the measurement and transmit the measurement report to the macro cell base station 100.

Then, in step S810, the macro cell base station 100 selects the measurement report fed back in step S808.

Then, in step S812, the macro cell base station 100 transmits the measurement report selected in step S810 to the frequency manager 300.

The present sequence can be performed in the scenario 1+2a/2b.

Here, the frequency manager 300 may acquire the information related to the throughput according to an operation process similar to those of FIGS. 23, 224, and 26.

[3-2. Frequency Setting Process]

Operation process examples in which the frequency manager 300 sets the frequency to be used in the base station 100 will be described below with reference to FIGS. 27 to 29.

Process Example 1

Figure 27:
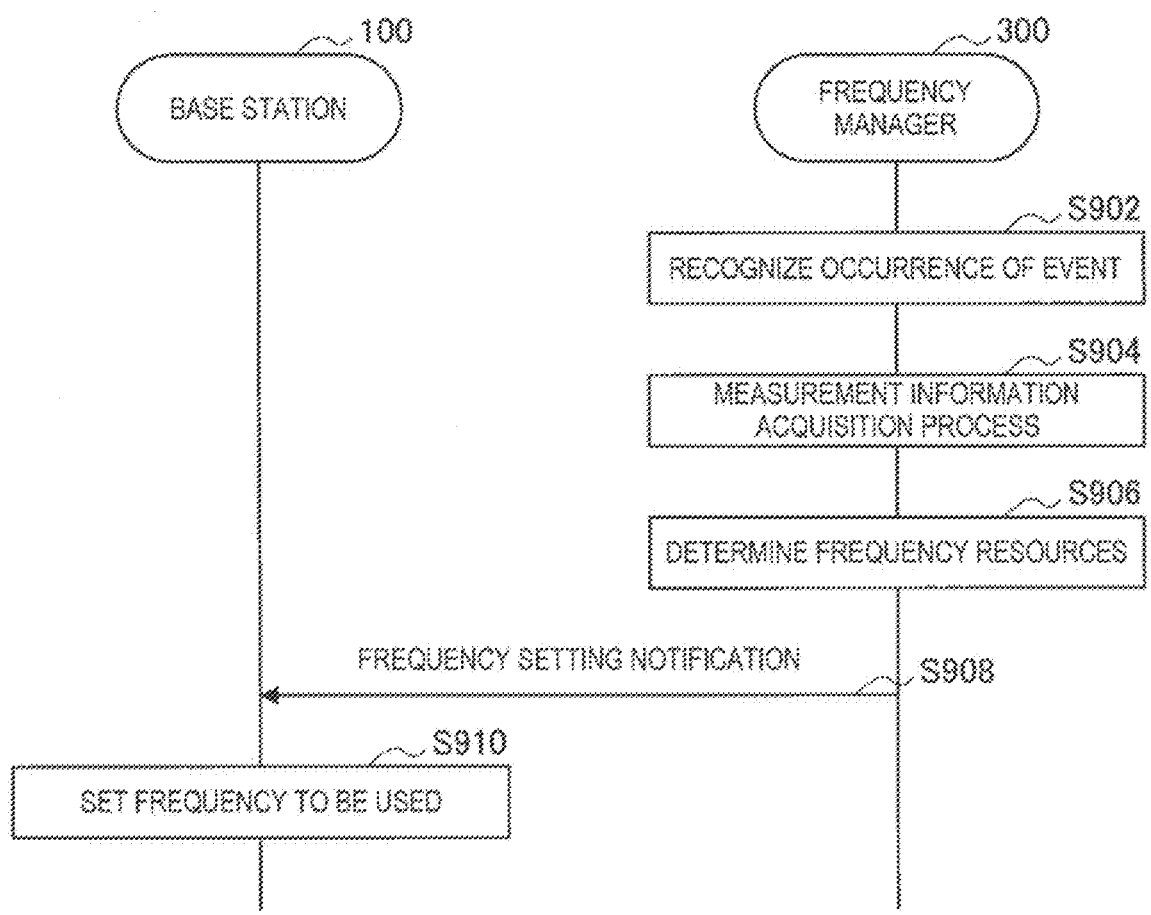
FIG. 27 is a sequence diagram illustrating an example of a flow of a frequency setting process performed in a wireless communication system according to the present embodiment.

FIG. 27 is a sequence diagram illustrating an example of a flow of a frequency setting process performed in the wireless communication system 1 according to the present embodiment. As illustrated in FIG. 27, the base station 100 and the frequency manager 300 are involved in the present sequence.

First, in step S902, the frequency manager 300 recognizes the occurrence of an event.

Then, in step S904, the frequency manager 300 performs the measurement information acquisition process. The measurement information acquisition process has been described above with reference to FIGS. 19 to 26.

Then, in step S906, the frequency manager 300 determines the frequency resources to be used in the base station 100. For example, the frequency manager 300 determines whether or not it is necessary to change the frequency using any one of the algorithm examples 1 to 4 based on the measurement information acquired in the above step S904, and determines the frequency to be allocated to the base station 100.

Then, in step S908, the frequency manager 300 transmits a frequency setting notification including information indicating the frequency to be allocated to the base station 100 to the base station 100.

In step S910, the base station 100 sets the frequency designated by the frequency setting notification received in step S908 as the frequency to be used.

The present sequence can be performed in the scenarios 3, 1+2a/2b, and 3'.

Process Example 2

Figure 28:
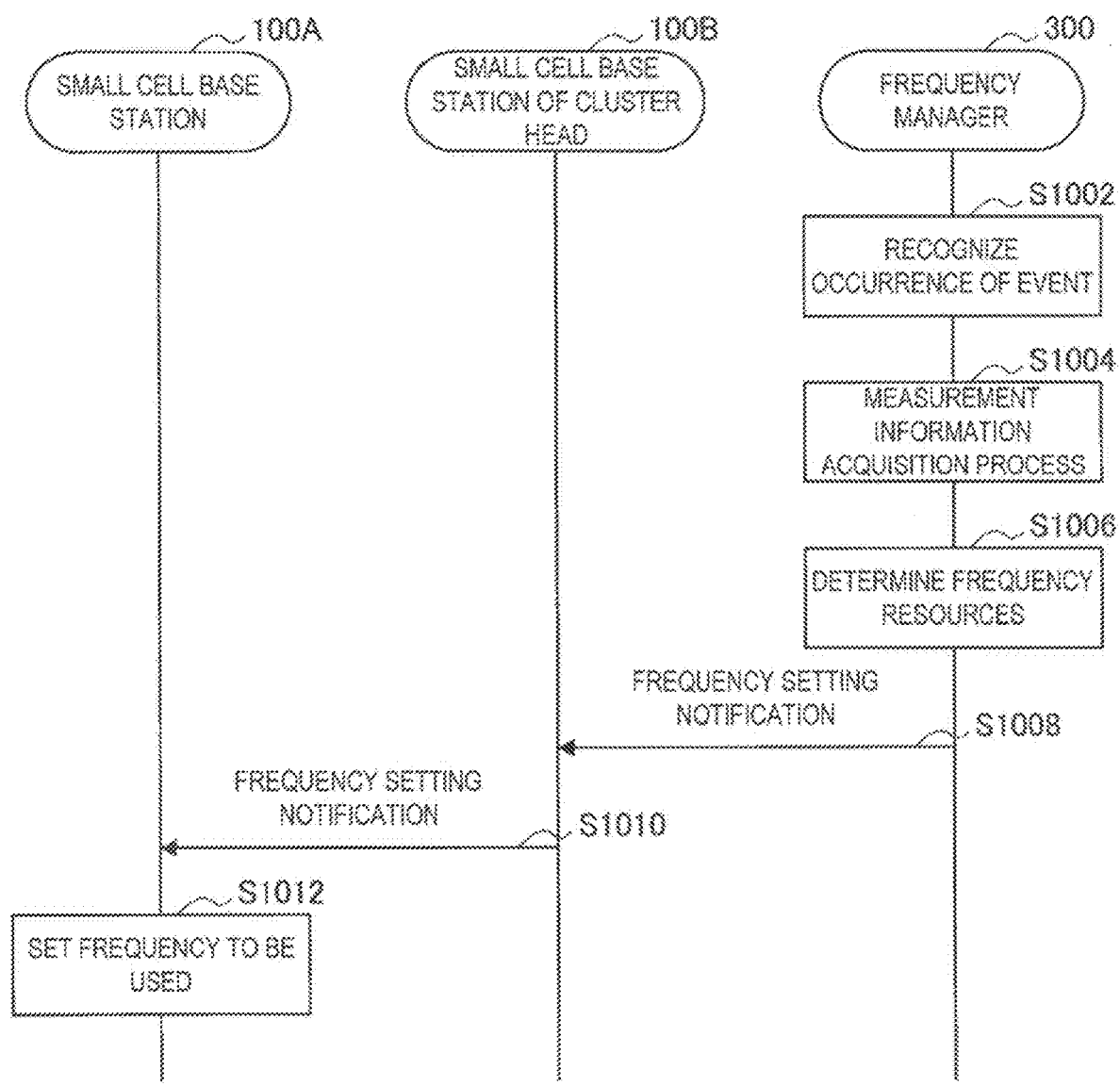
FIG. 28 is a sequence diagram illustrating an example of a flow of a frequency setting process performed in the wireless communication system according to the present embodiment.

FIG. 28 is a sequence diagram illustrating an example of a flow of a frequency setting process performed in the wireless communication system 1 according to the present embodiment. As illustrated in FIG. 28, the small cell base station 100A in the cluster, the small cell base station 100B of the cluster head, and the frequency manager 300 are involved in the present sequence.

First, in step S1002, the frequency manager 300 recognizes the occurrence of an event.

Then, in step S1004, the frequency manager 300 performs the measurement information acquisition process.

Then, in step S1006, the frequency manager 300 determines the frequency resources to be used in the small cell cluster.

Then, in step S1008, the frequency manager 300 transmits the frequency setting notification including the information indicating the frequency to be allocated to the small cell cluster to the small cell base station 100B of the cluster head.

Then, in step S1010, the small cell base station 100B of the cluster head transmits the frequency setting notification received in step S1008 to the small cell base station 100A in the cluster.

In step S1012, the small cell base station 100A sets the frequency designated by the frequency setting notification received in step S1010 as the frequency to be used. The base station 100B of the cluster head may also set the frequency designated by the frequency setting notification received in step S1008 as the frequency to be used.

The present sequence can be performed in the scenarios 3, 1+2a/2b, and 3'.

Process Example 3

Figure 29:
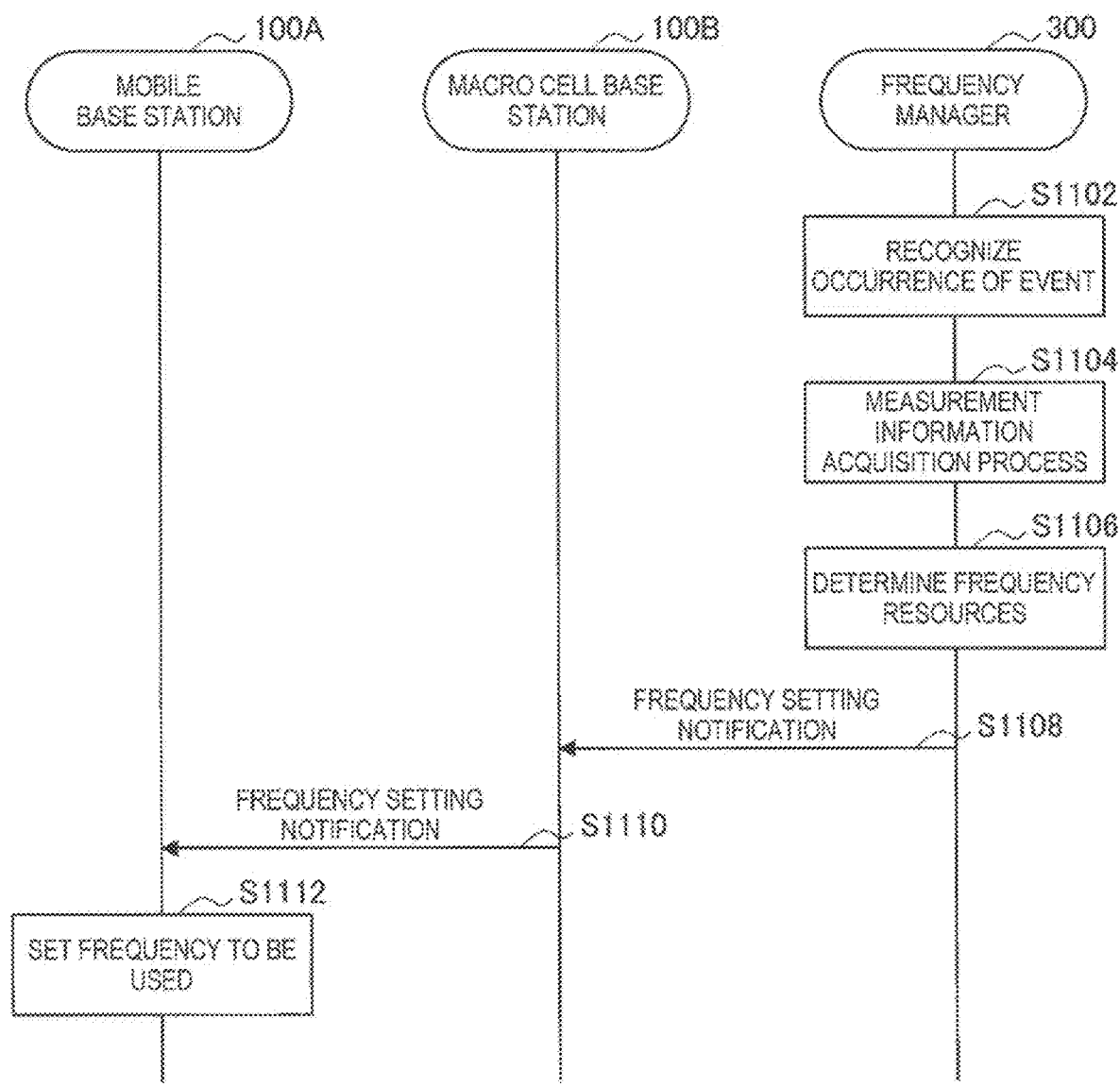
FIG. 29 is a sequence diagram illustrating an example of a flow of a frequency setting process performed in the wireless communication system according to the present embodiment.

FIG. 29 is a sequence diagram illustrating an example of a flow of a frequency setting process performed in the wireless communication system 1 according to the present embodiment. As illustrated in FIG. 29, the mobile base station 100A, the macro cell base station 100B, and the frequency manager 300 are involved in the present sequence.

First, in step S1102, the frequency manager 300 recognizes the occurrence of an event.

Then, in step S1104, the frequency manager 300 performs the measurement information acquisition process.

Then, in step S1106, the frequency manager 300 determines the frequency resources to be used in the mobile base station 100A.

Then, in step S1108, the frequency manager 300 transmits the frequency setting notification including the information indicating the frequency allocated to the mobile base station 100A to the macro cell base station 100B.

Then, in step S1110, the macro cell base station 100B transmits the frequency setting notification received in step S1108 to the mobile base station 100A.

In step S1112, the mobile base station 100A sets the frequency designated by the frequency setting notification received in step S1110 as the frequency to be used.

The present sequence can be performed in the scenario 1+2a/2b.

4. APPLICATION EXAMPLES

The technology of the present disclosure is applicable to various products. For example, the frequency manager 300 may be realized as any type of server such as a tower server, a rack server, and a blade server. The frequency manager 300 may be a control module (such as an integrated circuit module including a single die, and a card or a blade that is inserted into a slot of a blade server) mounted on a server.

For example, a base station 100 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station device) configured to control wireless communication, and one or more remote radio heads (RRH) disposed in a different place from the main body. Additionally, various types of terminals to be discussed later may also operate as the base station 100 by temporarily or semi-permanently executing a base station function.

For example, the user terminal 200 may be realized as a mobile terminal such as a smartphone, a tablet personal computer (PC), a notebook PC, a portable game terminal, a portable/dongle type mobile router, and a digital camera, or an in-vehicle terminal such as a car navigation device. The user terminal 200 may also be realized as a terminal (that is also referred to as a machine type communication (MTC) terminal) that performs machine-to-machine (M2M) communication. Furthermore, the user terminal 200 may be a wireless communication module (such as an integrated circuit module including a single die) mounted on each of the terminals.

[4-1. Application Example Regarding Frequency Manager]

Figure 30:
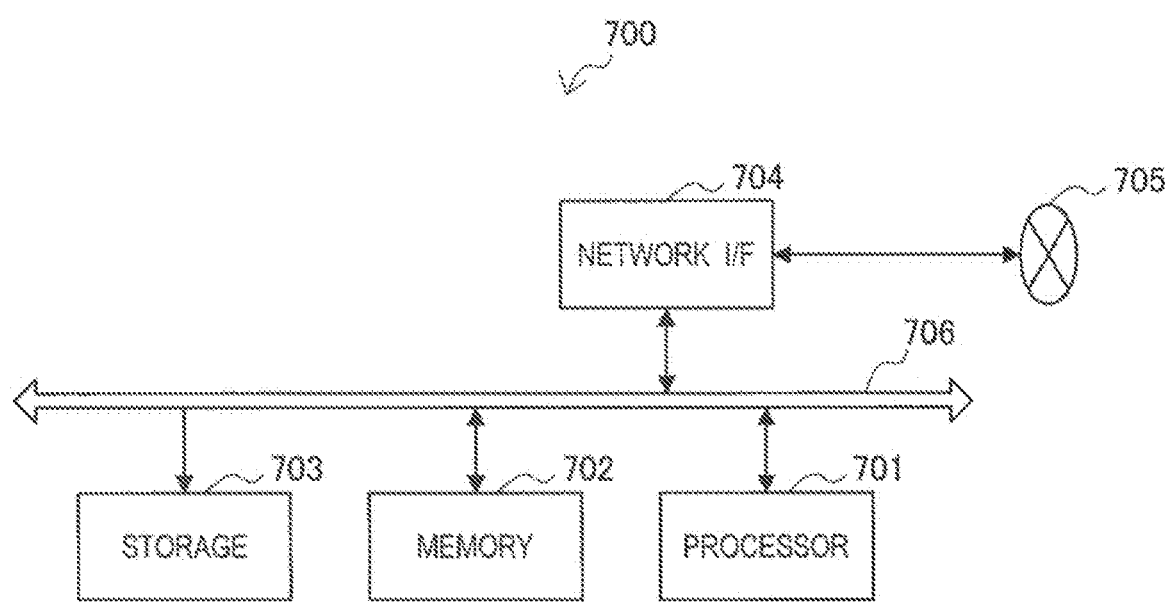
FIG. 30 is a block diagram illustrating an example of a schematic configuration of a server.

FIG. 30 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

The server 700 illustrated in FIG. 30 may operate as the frequency manager 300. In this case, for example, the communication unit 310, the storage unit 320, and the control unit 330 described above with reference to FIG. 16 may be implemented in the processor 701.

[4-2. Application Examples Regarding Base Stations]

First Application Example

Figure 31:
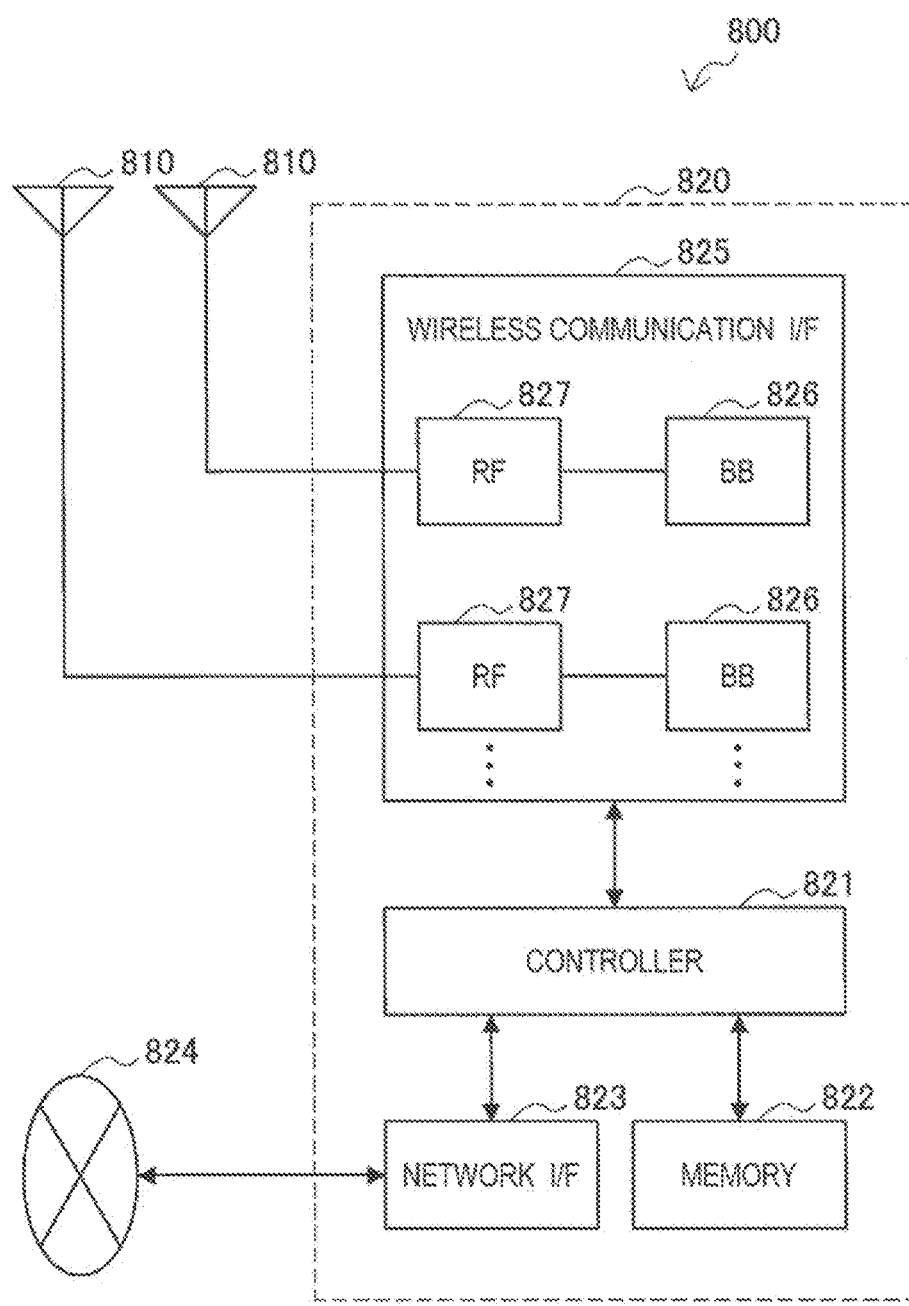
FIG. 31 is a block diagram illustrating a first example of a schematic configuration of an eNB.

FIG. 31 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive wireless signals. The eNB 800 may include the multiple antennas 810, as illustrated in FIG. 31. For example, the multiple antennas 810 may be compatible with multiple frequency bands used by the eNB 800. Although FIG. 31 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an Si interface and an X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the multiple BB processors 826, as illustrated in FIG. 31. For example, the multiple BB processors 826 may be compatible with multiple frequency bands used by the eNB 800. The wireless communication interface 825 may include the multiple RF circuits 827, as illustrated in FIG. 31. For example, the multiple RF circuits 827 may be compatible with multiple antenna elements. Although FIG. 31 illustrates the example in which the wireless communication interface 825 includes the multiple BB processors 826 and the multiple RF circuits 827, the wireless communication interface 825 may also include a single BB processor 826 or a single RF circuit 827.

Second Application Example

Figure 32:
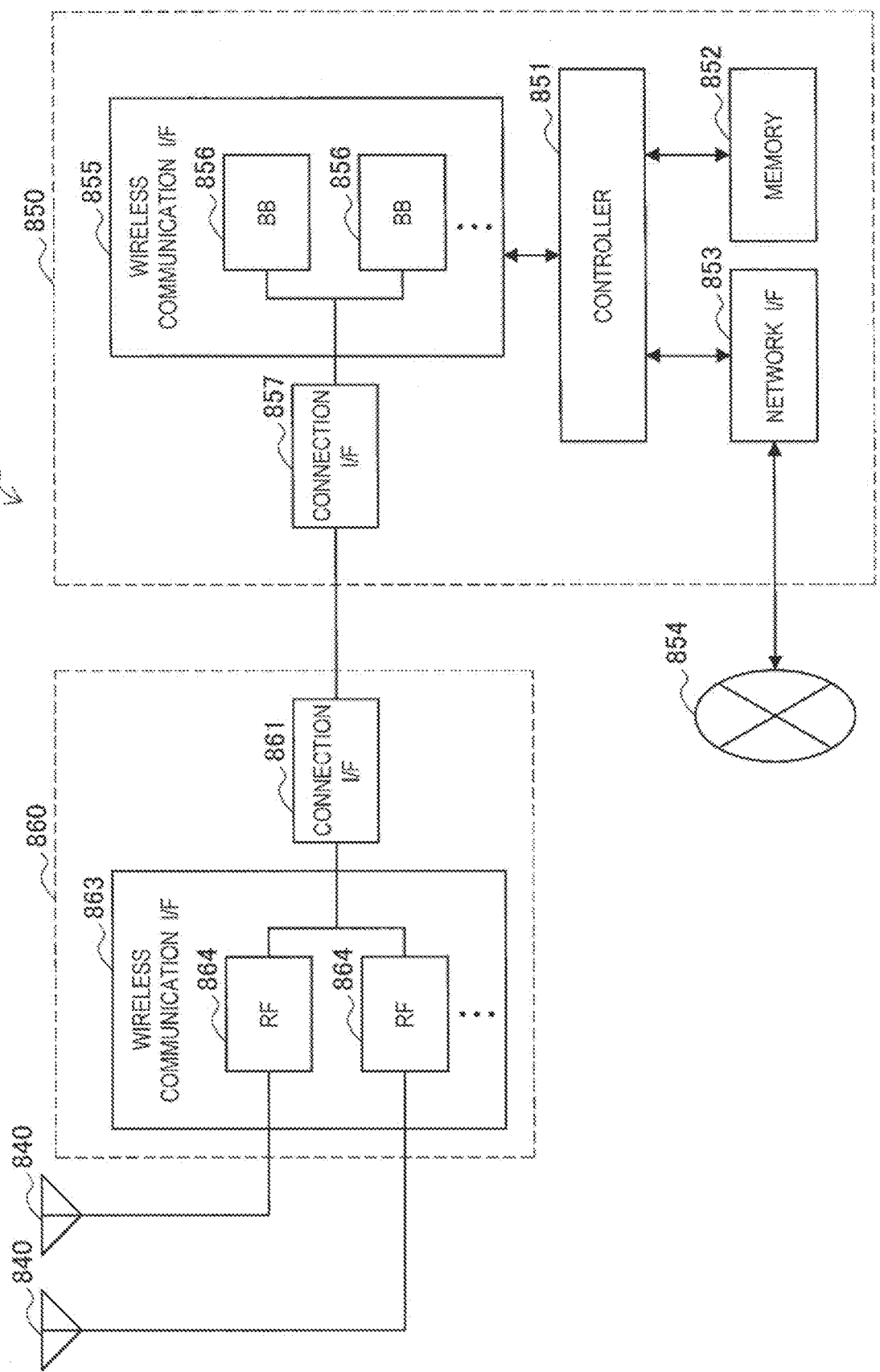
FIG. 32 is a block diagram illustrating a second example of the schematic configuration of the eNB.

FIG. 32 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive wireless signals. The eNB 830 may include the multiple antennas 840, as illustrated in FIG. 32. For example, the multiple antennas 840 may be compatible with multiple frequency bands used by the eNB 830. Although FIG. 32 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 31.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 31, except the BB processor 856 is connected to the RF circuit 864 of the RRH 860 via the connection interface 857. The wireless communication interface 855 may include the multiple BB processors 856, as illustrated in FIG. 32. For example, the multiple BB processors 856 may be compatible with multiple frequency bands used by the eNB 830. Although FIG. 32 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 32. For example, the multiple RF circuits 864 may support multiple antenna elements. Although FIG. 32 illustrates the example in which the wireless communication interface 863 includes the multiple RF circuits 864, the wireless communication interface 863 may also include a single RF circuit 864.

The eNB 800 and the eNB 830 illustrated in FIGS. 31 and 32 may operate as the base station 100. In this case, for example, the wireless communication unit 110, the communication unit 120, the storage unit 130, and the control unit 140 described above with reference to FIG. 14 may be implemented in the wireless communication interface 825 and the wireless communication interface 855 and/or the wireless communication interface 863. At least some functions may be implemented in the controller 821 and the controller 851.

[4-3. Application Examples Regarding User Terminal Devices]

First Application Example

Figure 33:
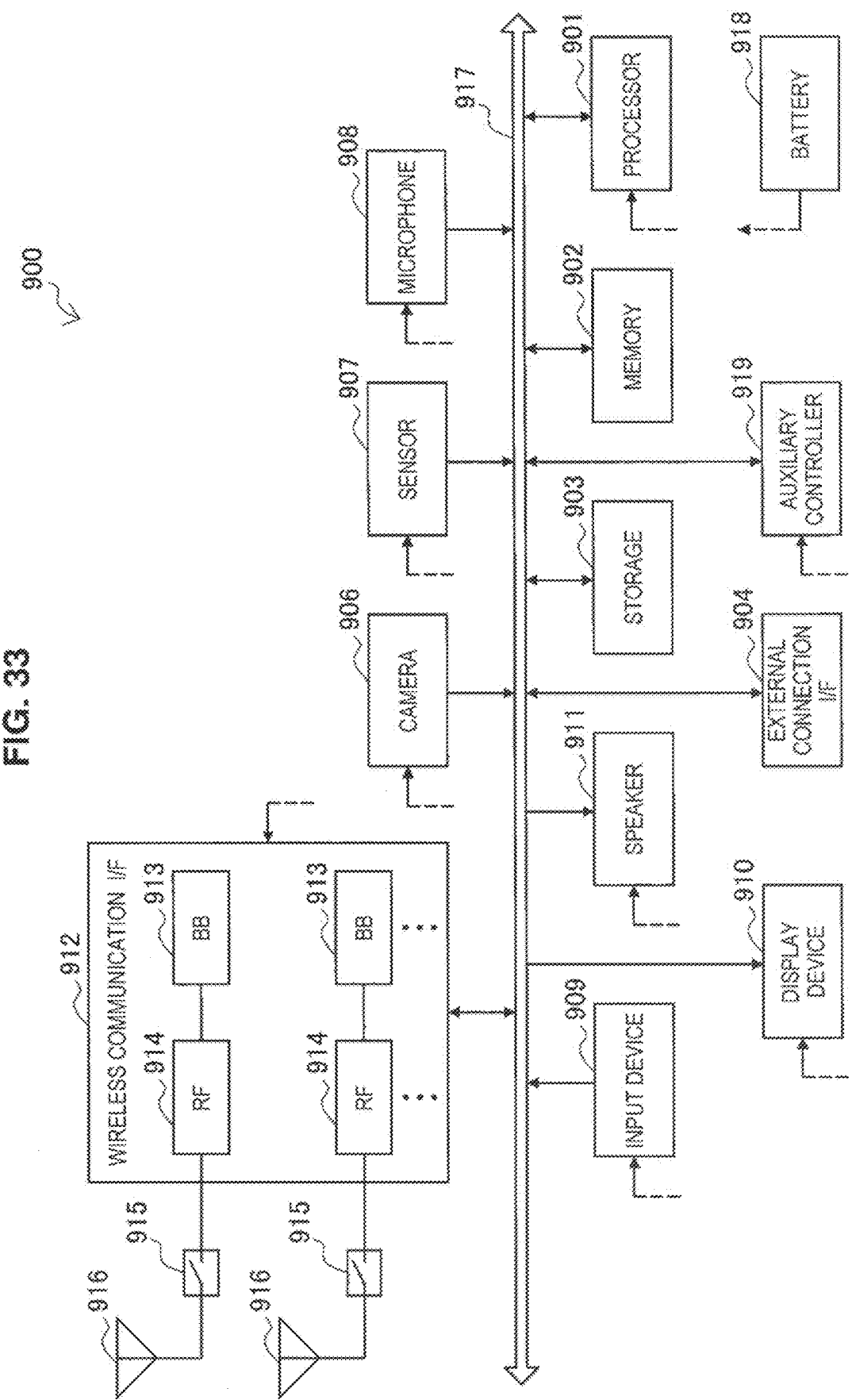
FIG. 33 is a block diagram illustrating an example of a schematic configuration of a smartphone.

FIG. 33 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication interface 913 may also be a one chip module that has the BB processor 913 and the RF circuit 914 integrated thereon. The wireless communication interface 912 may include the multiple BB processors 913 and the multiple RF circuits 914, as illustrated in FIG. 33. Although FIG. 33 illustrates the example in which the wireless communication interface 913 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive wireless signals. The smartphone 900 may include the multiple antennas 916, as illustrated in FIG. 33. Although FIG. 33 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 33 via feeder lines, which are partially shown as dashed lines in the figure. The auxiliary controller 919 operates a minimum necessary function of the smartphone 900, for example, in a sleep mode.

The smartphone 900 illustrated in FIG. 33 may operate as the user terminal 200. In this case, for example, the wireless communication unit 210, the storage unit 220, and the control unit 230 described above with reference to FIG. 15 may be implemented in the wireless communication interface 912. Further, at least some functions may be implemented in the processor 901 or the auxiliary controller 919.

Second Application Example

FIG. 34 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 34. Although FIG. 34 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive wireless signals. The car navigation device 920 may include the multiple antennas 937, as illustrated in FIG. 34. Although FIG. 34 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 34 via feeder lines that are partially shown as dashed lines in the figure. The battery 938 accumulates power supplied form the vehicle.

The car navigation device 920 illustrated in FIG. 34 may operate as the user terminal 200. In this case, for example, the wireless communication unit 210, the storage unit 220, and the control unit 230 described with reference to FIG. 15 may be implemented in the wireless communication interface 933. Further, at least some functions may be implemented in the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

5. CONCLUSION

The wireless communication system 1 according to the present embodiment has been described in detail above with reference to FIGS. 1 to 34. As described above, the frequency manager 300 that communicates with the base station 100 of the wireless communication system 1 in which one or more frequencies are used sets an event and sets the frequency to be used by the base station 100 using the occurrence of the set event as a trigger. The frequency manager 300 can set an arbitrary event according to a geographical environment in which the base station 100 is installed, a radio wave environment, development of a wireless communication technique, and the like. Thus, the frequency manager 300 can adjust the frequency resources at an appropriate timing according to such circumstances serving as the cause of the event setting. Further, the frequency manager 300 can set the frequency to be used by the base station 100 to prevent the influence of the inter-cell interference or the like. As a result, the user throughput and the frequency usage efficiency are improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The series of control processes carried out by each apparatus described in the present specification may be realized by software, hardware, or a combination of software and hardware. Programs that compose such software may be stored in advance for example on a storage medium (non-transitory medium) provided inside or outside each of the apparatus. As one example, during execution, such programs are written into RAM (Random Access Memory) and executed by a processor such as a CPU.

Note that it is not necessary for the processing described in this specification with reference to the flowchart to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A communication control device including:

a communication unit configured to communicate with a base station of a wireless communication system in which one or more frequencies are used; and a setting unit configured to set an event and set a frequency to be used by the base station using occurrence of the set event as a trigger.

(2)

The communication control device according to (1), further including a determining unit configured to determine whether or not the frequency used by the base station is changed.

(3)

The communication control device according to (2), wherein the determining unit performs the determining using information indicating a communication environment in the wireless communication system.

(4)

The communication control device according to (3), wherein the determination unit performs the determining using information indicating influence of inter-cell interference among the information indicating the communication environment in the wireless communication system.

(5)

The communication control device according to any one of (1) to (4), wherein the event is that a base station belonging to the wireless communication system starts or stops use of the frequency.

(6)

The communication control device according to any one of (1) to (5), wherein the event is arrival of a preset time.

(7)

The communication control device according to any one of (1) to (6), wherein the event is that a terminal device belonging to the wireless communication system switches to a base station mode.

(8)

The communication control device according to any one of (1) to (7), wherein the event is acquisition of a measurement report related to measurement (inter-frequency measurement) by a terminal device belonging to the wireless communication system.

(9)

The communication control device according to any one of (1) to (8), wherein the event is determination indicating that protection of another wireless communication system having a higher priority than the wireless communication system is insufficient.

(10)

The communication control device according to any one of (1) to (9), wherein the event is occurrence of a coverage hole in an area of a cluster composed of one or more cells included in the wireless communication system.

(11)

The communication control device according to any one of (1) to (10), further including an acquiring unit configured to acquire information for the setting by the setting unit.

(12)

The communication control device according to (11), wherein the acquiring unit acquires the information for the setting by the setting unit from another communication control device.

(13)

The communication control device according to (11) or (12), wherein the acquiring unit acquires a message indicating the occurrence of the event.

(14)

The communication control device according to any one of (11) to (13), wherein the acquiring unit acquires information indicating a communication environment in a device belonging to the wireless communication system.

(15)

The communication control device according to (14), wherein the information indicating the communication environment is a measurement result from a base station belonging to the wireless communication system.

(16)

The communication control device according to (14) or (15), wherein the information indicating the communication environment is a measurement result from a terminal device belonging to the wireless communication system.

(17)

The communication control device according to any one of (1) to (16), further including a notifying unit configured to give a notification of information indicating that the frequency used by the base station is changed to a terminal device communicating with the base station.

(18)

The communication control device according to (17), wherein the notifying unit gives the notification using a PBCH, a PUCCH, a PDSCH, or a dedicated signal.

(19)

The communication control device according to any one of (1) to (18), wherein the communication unit transmits information indicating the frequency set by the setting unit to the base station.

(20)

The communication control device according to any one of (1) to (19), wherein the setting unit sets frequencies to be used by a plurality of clustered base stations.

(21)

The communication control device according to any one of (1) to (20), wherein the setting unit sets a frequency used by a terminal device operating as a mobile base station.

(22)

A base station including:

a wireless communication unit configured to perform wireless communication with a terminal device using one or more frequencies;

a communication unit configured to communicate with a communication control device configured to set an event; and a control unit configured to control the wireless communication unit such that a frequency set by the communication control device via the communication unit is used using occurrence of the event as a trigger.

(23)

The communication control device according to (22), wherein the communication unit transmits information indicating a communication environment in the base station to the communication control device.

(24)

The communication control device according to (22) or (23), wherein the communication unit transmits information indicating a communication environment in the terminal device which is received by the wireless communication unit to the communication control device.

(25)

A terminal device including:

a wireless communication unit configured to communicate with a base station of a wireless communication system in which one or more frequencies are used; and a control unit configured to perform control such that information used for setting a frequency to be used by the base station of the wireless communication system is transmitted to a communication control device via the wireless communication unit using occurrence of an event set by the communication control device as a trigger.

(26)

The terminal device according to (25), wherein the control unit controls the wireless communication unit such that handover to a cell operated by a changed frequency is performed in a case where a frequency used in a base station with which the wireless communication unit communicates is changed.

(27)

The terminal device according to claim 25), wherein the control unit controls the wireless communication unit such that handover to a cell operated by another base station is performed in a case where a frequency used in a base station with which the wireless communication unit communicates is changed.

(28)

A communication control method including:

communicating with a base station of a wireless communication system in which one or more frequencies are used through a communication control device; and setting an event and setting a frequency to be used by the base station using occurrence of the set event as a trigger.

(29)

A wireless communication method, including:

performing wireless communication with a terminal device using one or more frequencies;

communicating with a communication control device configured to set an event; and performing, by a processor, control such that the frequency set by the communication control device using occurrence of an event as a trigger is used.

(30)

A wireless communication method including:

communicating with a base station of a wireless communication system in which one or more frequencies are used; and performing, by a processor, control such that information used for setting a frequency to be used by the base station of the wireless communication system is transmitted to a communication control device using occurrence of an event set by the communication control device as a trigger.

(31)

A program for causing a computer to function as:

a communication unit configured to communicate with a base station of a wireless communication system in which one or more frequencies are used; and a setting unit configured to set an event and set a frequency to be used by the base station using occurrence of the set event as a trigger.

(32)

A program for causing a computer to function as:

a wireless communication unit configured to perform wireless communication with a terminal device using one or more frequencies;

a communication unit configured to communicate with a communication control device configured to set an event; and a control unit configured to control the wireless communication unit such that a frequency set by the communication control device via the communication unit is used using occurrence of the event as a trigger.

(33)

A program for causing a computer to function as:

a wireless communication unit configured to communicate with a base station of a wireless communication system in which one or more frequencies are used; and a control unit configured to perform control such that information used for setting a frequency to be used by the base station of the wireless communication system is transmitted to a communication control device via the wireless communication unit using occurrence of an event set by the communication control device as a trigger.

REFERENCE SIGNS LIST 1 wireless communication system
11 macro cell
12 small cell
13 backhaul link
14 small cell cluster
100 base station
110 wireless communication unit
120 communication unit
130 storage unit
140 control unit
200 user terminal
210 wireless communication unit
220 storage unit
230 control unit
300 frequency manager
310 communication unit
320 storage unit
330 control unit
331 acquiring unit
333 determining unit
335 setting unit
337 notifying unit

The invention claimed is:

1. A communication control device, comprising:

wireless communication circuitry configured to communicate with one or more base stations of a second wireless communication system, the second wireless communication system sharing one or more frequencies with a first wireless communication system having a higher priority than the second wireless communication system, and receive information indicating that the first wireless communication system should be protected; and processing circuitry configured to determine whether protection of the first wireless communication system is insufficient based on the received information, in response to determining that protection of the first wireless communication system is insufficient, transmit, via the wireless communication circuitry, to a base station of the one or more base stations, a signal indicating a request for a measurement report, receive, via the wireless communication circuitry, the measurement report from the base station, and determine one or more frequency ranges to be used by the base station based on the received measurement report.

2. The communication control device according to claim 1, wherein
the wireless communication circuitry is configured to receive, from the base station, information indicating communication environment of the second wireless communication system.

3. The communication control device according to claim 2, wherein
the processing circuitry is configured to determine the one or more frequency ranges based on the received information indicating communication environment of the second wireless communication system.

4. The communication control device according to claim 2, wherein
the processing circuitry is configured to determine that protection of the first wireless communication system is insufficient based on the received information indicating communication environment of the second wireless communication system.

5. The communication control device according to claim 1, wherein
the wireless communication circuitry is configured to receive a protection request from the second wireless communication system.

6. The communication control device according to claim 5, wherein
the processing circuitry is configured to determine that the protection of the first wireless communication system is insufficient based on the protection request from the second wireless communication system.

7. The communication control device according to claim 1, wherein
the processing circuitry is configured to determine whether or not a frequency used by the base station is changed.

8. The communication control device according to claim 2, wherein
the processing circuitry is configured to determine whether or not a frequency used by the base station is changed using the information indicating the communication environment.

9. The communication control device according to claim 8, wherein
the processing circuitry is configured to determine whether or not the frequency used by the base station is changed using information indicating influence of inter-cell interference among the information indicating the communication environment.

10. A communication control method for a communication control device, the communication control method comprising:
communicating with one or more base stations of a second wireless communication system, the second wireless communication system sharing one or more frequencies with a first wireless communication system having a higher priority than the second wireless communication system;

receiving information indicating that the first wireless communication system should be protected;

determining, using processing circuitry, whether protection of the first wireless communication system is insufficient based on the received information;

in response to determining that protection of the first wireless communication system is insufficient, transmitting to a base station of the one or more base stations, a signal indicating a request for a measurement report;

receiving the measurement report from the base station; and determining, using the processing circuitry, one or more frequency ranges to be used by the base station based on the received measurement report.

11. The communication control method according to claim 10, further comprising:
receiving, from the base station, information indicating communication environment of the second wireless communication system.

12. The communication control method according to claim 11, further comprising:
determining, using the processing circuitry, the one or more frequency ranges based on the received information indicating communication environment of the second wireless communication system.

13. The communication control method according to claim 11, further comprising:
determining, using the processing circuitry, that protection of the first wireless communication system is insufficient based on the received information indicating communication environment of the second wireless communication system.

14. A communication control device, comprising:
wireless communication circuitry configured to
communicate with one or more base stations of a second wireless system, the second wireless system sharing one or more frequencies with a first wireless system having a higher priority than the second wireless system, and processing circuitry configured to
acquire an information indicating a protection of the first wireless system is insufficient, in response to acquiring the information, transmit, via the wireless communication circuitry, to a base station of the one or more base stations, a signal indicating a request for a measurement report, receive, via the wireless communication circuitry, the measurement report from the base station, and determine one or more frequency ranges to be used by the base station based on the received measurement report.

15. The communication control device according to claim 14, wherein
the wireless communication circuitry is configured to receive, from the base station, information indicating communication environment of the second wireless system.

16. The communication control device according to claim 15, wherein
the processing circuitry is configured to determine the one or more frequency ranges based on the received information indicating communication environment of the second wireless system.

* * * * *